(12) United States Patent
Ovshinsky et al.

(10) Patent No.: US 7,226,675 B2
(45) Date of Patent: Jun. 5, 2007

(54) VERY LOW EMISSION HYBRID ELECTRIC VEHICLE INCORPORATING AN INTEGRATED PROPULSION SYSTEM INCLUDING A FUEL CELL AND A HIGH POWER NICKEL METAL HYDRIDE BATTERY PACK

(75) Inventors: Stanford R. Ovshinsky, Bloomfield Hills, MI (US); Robert C. Stempel, Oxford, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 513 days.

(21) Appl. No.: 10/315,669

(22) Filed: Dec. 9, 2002

(65) Prior Publication Data

US 2003/0129459 A1    Jul. 10, 2003

Related U.S. Application Data

(63) Continuation-in-part of application No. 09/687,717, filed on Oct. 13, 2000, now Pat. No. 6,492,056.

(51) Int. Cl.
| | |
|---|---|
| *H01M 12/00* | (2006.01) |
| *H01M 4/90* | (2006.01) |
| *H01M 10/50* | (2006.01) |
| *H01M 2/16* | (2006.01) |
| *H01M 4/58* | (2006.01) |
| *H01M 16/00* | (2006.01) |
| *H01M 10/46* | (2006.01) |

(52) U.S. Cl. ............... 429/9; 429/218.2; 429/254; 429/120; 429/42; 429/40; 429/27; 429/44; 429/218.1; 429/19; 429/17; 180/65.3; 320/101

(58) Field of Classification Search ............... 429/9, 429/218.2, 254, 120, 42, 40, 27, 44, 218.1, 429/19, 17; 180/65.3; 320/101
See application file for complete search history.

(56) References Cited

U.S. PATENT DOCUMENTS

| 4,335,429 | A | * | 6/1982 | Kawakatsu | ............... 701/102 |
| 5,277,999 | A | * | 1/1994 | Ovshinsky et al. | ............... 429/59 |
| 6,193,929 | B1 | * | 2/2001 | Ovshinsky et al. | ............... 420/402 |
| 6,649,289 | B2 | * | 11/2003 | Hsu et al. | ............... 429/13 |
| 2003/0180584 | A1 | * | 9/2003 | Suzuki et al. | ............... 429/9 |

* cited by examiner

*Primary Examiner*—Raymond Alejandro
*Assistant Examiner*—Angela J. Martin
(74) *Attorney, Agent, or Firm*—David W. Schumaker; Marvin S. Siskind

(57) ABSTRACT

A very low emission hybrid electric vehicle incorporating an integrated propulsion system which includes a fuel cell, a metal hydride hydrogen storage unit, an electric motor, high specific power, high energy density nickel-metal hydride (NiMH) batteries, and preferably a regenerative braking system. The nickel-metal hydride battery module preferably has a peak power density in relation to energy density as defined by:

$$P > 1,375 - 15E,$$

where P is greater than 600 Watts/kilogram, where P is the peak power density as measured in Watts/kilogram and E is the energy density as measured in Watt-hours/kilogram.

61 Claims, 19 Drawing Sheets

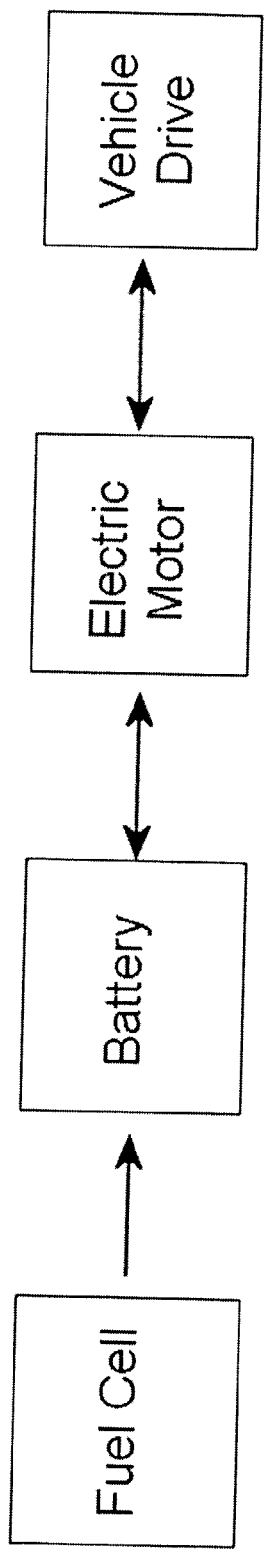
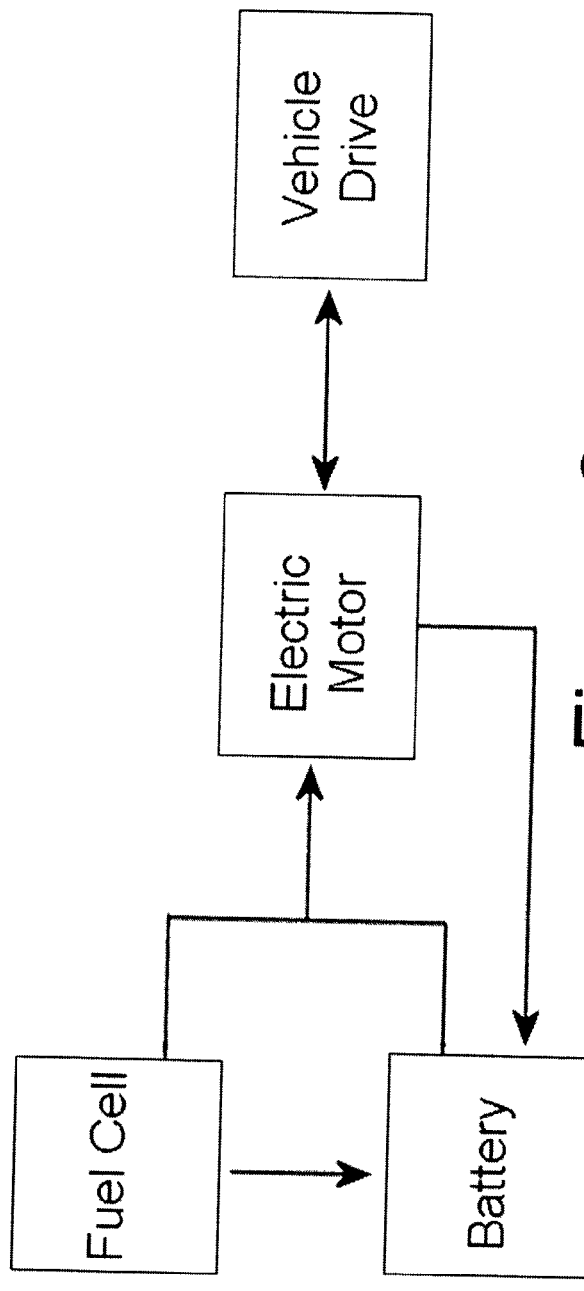
Figure 1
Figure 2

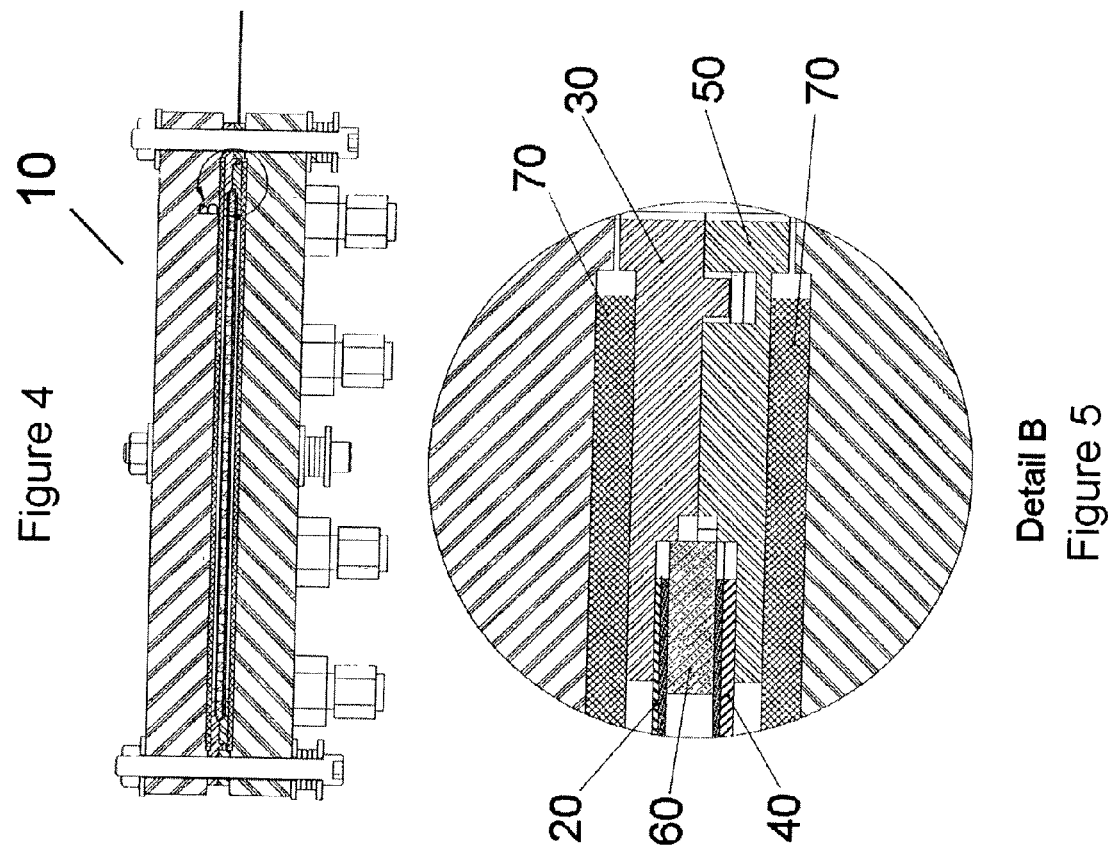

VERY LOW EMISSION HYBRID ELECTRIC VEHICLE INCORPORATING AN INTEGRATED PROPULSION SYSTEM INCLUDING A FUEL CELL AND A HIGH POWER NICKEL METAL HYDRIDE BATTERY PACK

CROSS REFERENCE TO RELATED APPLICATIONS

The present invention is a continuation-in-part of, and is entitled to the benefit of the earlier filing date and priority of, U.S. patent application Ser. No. 09/687,717, entitled "Catalytic Hydrogen Storage Composite Material And Fuel Cell Employing Same", filed Oct. 13, 2000, now U.S. Pat. No. 6,492,056 which is assigned to the same assignee as the current application, the disclosure of which is hereby incorporated by reference.

FIELD OF THE INVENTION

The present invention relates generally to a very low emission hybrid electric vehicles incorporating an integrated propulsion system. More specifically, the present invention relates to hybrid electric vehicles with utilizing a fuel cell and battery.

BACKGROUND OF THE INVENTION

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may double the end of the next century, and could be much higher except for a continuing trend toward lower-carbon fuels. Furthermore, fossil fuels generate many other pollutants and are a causative factor in many strategic military struggles between nations.

For nearly a century and a half, fuels with high amounts of carbon/energy have progressively been replaced by those containing smaller amounts of carbon. Wood, which is high in carbon, was eclipsed in the late $19^{th}$ century by coal, which provides more energy. Then oil, with a lower carbon content still, dethroned "King Coal" in the 1960's. Now analysts say that natural gas, may be entering its heyday, and that the day of hydrogen—providing a fuel with no carbon at all—may at last be about to dawn. As a result, experts estimate the world's economy today burns less than two-thirds as much carbon per unit of energy produced as it did in 1860.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention shortens that period to a matter of years. In the near term, hydrogen will be used in fuel cells to power cars, trucks and industrial plants, just as it already provides power for orbiting spacecraft. But ultimately, hydrogen will provide a carbon-free fuel to cover all fuel needs.

As noted in recent newspaper articles, large industries, especially in America, have long been suspicious of claims that the globe is warming and have vociferously negated the science of climate change. Electric utilities have even tried to stoke fears among ordinary folk that international treaties on climate change would cut economic growth and cost jobs. Therefore, it is very encouraging that some of the world's biggest companies, such as Royal Dutch/Shell and BP Amoco, two large European oil firms, now state plainly what was once considered heresy: global warming is real and merits immediate action. A number of American utilities have vowed to find ways to reduce the harm done to the atmosphere by their power plants. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." It is considered by most to be "THE" fuel for the next millennium, and, it is inexhaustible. Hydrogen is the most plentiful element in the universe (over 95%) and was the first element created by the "Big-Bang." Hydrogen can provide an inexhaustible, clean source of energy for our planet which can be produced by splitting water into hydrogen and oxygen. The hydrogen can be stored and transported in solid state form and form the basis of a HYDROGEN ECONOMY™, trademark of Energy Conversion Devices, Inc. For example, economical, lightweight, triple-junction amorphous silicon solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency solar panels on nearby farms, in water, or on land, electricity can be generated to transport and pump hydrogen into storage beds or tanks. These beds or tanks may include the inventive metal hydride alloys as disclosed herein, as well as others. The capacities of these alloys allow hydrogen to be stored in solid form for transport by barge, tanker, train or truck in safe, economical form for ultimate use. Energy is the basic necessity of life and civilization for any society today, and the use of hydrogen in the manner described herein as the basic source of energy could end wars fought for control of fossil fuels. Instead of "from well to wheel," the phrase now recited will be "from source to wheel."

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water. Electrolysis may be performed using energy from the sun which is composed mainly of hydrogen and can itself be thought of as a giant hydrogen "furnace". Moreover hydrogen can be produced without the use of fossil fuels, such as by the electrolysis of water using nuclear or solar energy, or any other form of economical energy (e.g. wind, waves, geothermal, etc.). Furthermore, hydrogen, although presently more expensive than petroleum, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependency on oil, etc., as well as providing a means of helping developing nations.

While hydrogen has wide potential application as a fuel, a major drawback in its utilization, especially in mobile uses such as the powering of vehicles, has been the lack of acceptable lightweight storage medium. Conventionally, hydrogen has been stored in pressure-resistant vessels under a high pressure or stored as a cryogenic liquid, being cooled to an extremely low temperature. Storage of hydrogen as a compressed gas or liquid involves the use of large and heavy vessels, making the use of hydrogen to power vehicles less feasible.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Some of these alloys are described in U.S. Pat. No. 6,193,919, entitled "High Storage Capacity Alloys Enabling a Hydrogen-based Ecosystem", which is hereby incorporated by reference.

With these developments in the storage of hydrogen, hydrogen now has a viable use as a fuel to power vehicles. Solid-phase metal or alloy systems can store large amounts of hydrogen by absorbing hydrogen with a high density and by forming a metal hydride under a specific temperature/pressure or electrochemical conditions, and hydrogen can be readily released by changing these conditions.

With hydrogen now being a viable source to power vehicles, considerable research has been performed on designing vehicles to run on hydrogen rather than fossil fuels. In these designs, hydrogen may be combusted inside an internal combustion engine or reacted in a fuel cell to power a vehicle. Such vehicles provide clean alternatives to internal combustion engines in widespread use today which utilize fossil fuels.

A fuel cell is an energy-conversion device that directly converts the energy of a supplied gas into electric energy. Researchers have been actively studying fuel cells to utilize the fuel cell's potential high energy-generation efficiency. The base unit of a fuel cell includes an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the P.E.M fuel cell, the remainder of the materials of construction of the fuel cell need to be compatible with such an environment, which again adds to the cost thereof. The proton exchange membrane itself is quite expensive, and because of its low conductivity, inherently limits the power performance and operational temperature range of the P.E.M. fuel cell (the PEM is nearly non-functional at low temperatures, unlike the fuel cell of the instant invention). Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuel cells in that they have higher operating efficiencies, they use less expensive materials of construction, and they have no need for expensive membranes. The alkaline fuel cell also has relatively higher ionic conductivity in the electrolyte, therefore it has a much higher power capability. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning. While the conventional alkaline fuel cell is less sensitive to temperature than the PEM fuel cell, the active materials of conventional alkaline fuel cell electrodes become very inefficient at low temperatures.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as fuel, such as hydrogen, and oxygen, is supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

In a typical fuel cell, reactants, such as hydrogen and oxygen, are respectively fed through a porous hydrogen electrode and oxygen electrode and brought into surface contact with the electrolytic solution. The particular materials utilized for the hydrogen electrode and oxygen electrode are important since they must act as efficient catalysts for the reactions taking place.

The reaction at the hydrogen electrode occurs between the hydrogen fuel and hydroxyl ions (OH⁻) present in the electrolyte, which react to form water and release electrons:

$$H_2 + 2OH^- \rightarrow 2H_2O + 2e^-.$$

At the oxygen electrode, oxygen, water, and electrons react in the presence of the oxygen electrode catalyst to reduce the oxygen and form hydroxyl ions (OH⁻):

$$O_2 + 2H_2O + 4e^- \rightarrow 4OH^-.$$

The flow of electrons is utilized to provide electrical energy for a load externally connected to the hydrogen and oxygen electrodes.

To provide vehicles with extended range and higher power, systems have been developed wherein a hydrogen internal combustion engine (ICE) operates in conjunction with a battery to power a vehicle. Such systems are termed "Hybrid Systems". An example of this type of system is disclosed in U.S. Pat. No. 6,330,925, entitled "Hybrid Electric Vehicle Incorporating An Integrated Propulsion System", the disclosure of which is herein incorporated by reference.

Hybrid systems have been divided into two broad categories, namely series and parallel systems. In a typical series system, a battery powers an electric propulsion motor which is used to drive a vehicle and an internal combustion engine is used to recharge the battery. In a parallel system, both the internal combustion engine and the battery power in conjunction with an electric motor can be used, either separately or together, to power a vehicle. In these types of vehicles, the battery is usually used only in short bursts to provide increased power upon demand after which the battery is recharged using the internal combustion engine or regenerative braking.

There are further variations within these two broad categories. One variation is made between systems which are "charge depleting" in the one case and "charge sustaining" in another case. In the charge depleting system, the battery charge is gradually depleted during use of the system and the battery thus has to be recharged periodically from an external power source, such as by means of connection to public utility power. In the charge sustaining system, the battery is recharged during use in the vehicle, through regenerative braking and also by means of electric power supplied from the a generator powered by the internal combustion engine so that the charge of the battery is maintained during operation.

There are many different types of systems that fall within the categories of "charge depleting" and "charge sustaining" and there are thus a number of variations within the foregoing examples which have been simplified for purposes of a general explanation of the different types. However, it is to be noted in general that systems which are of the "charge depleting" type typically require a battery which has a higher charge capacity (and thus a higher specific energy) than those which are of the "charge sustaining" type if a commercially acceptable driving range (miles between recharge) is to be attained in operation.

A key enabling technology for HEVs is having an energy storage system having a high energy density while at the same time being capable of providing very high power. Such a system allows of rrecapture of energy from braking currents at very high efficiency.

An example of such a battery has been demonstrated by the Ovonic Battery Company. The OVONIC™ Nickel Metal Hydride (NiMH) battery has reached an advanced stage of development for use in vehicles. OVONIC™ electric vehicle batteries are capable of not only high power but high energy as well as long cycle life, abuse tolerance, and rapid recharge capability.

SUMMARY OF THE INVENTION

The present invention provides a hybrid vehicle powered by both a fuel cell and a battery working in conjunction with each other. Such a system may allow extended range and an increased amount of power on demand for the vehicle. Unlike previous hybrid vehicles utilizing gasoline fueled internal combustion engines, the present invention provides power to a vehicle without producing harmful pollutants. The disclosed fuel cell used in conjunction with high powered Nickel Metal Hydride batteries thereby provides a clean alternative to powering vehicles, bringing the world one step closer to a "Hydrogen Based Ecosystem".

In one embodiment of the present invention there is provided a propulsion system for a hybrid vehicle comprising an integrated propulsion system including an alkaline fuel cell, a metal hydride hydrogen storage unit, an electric motor, a high specific power, high energy density nickel-metal hydride (NiMH) battery, and optionally a regenerative braking system. The NiMH batteries preferably have high peak power combined with high energy density and high cycle life at low depths of discharge.

In another embodiment of the present invention there is provided a power system for a hybrid vehicle comprising a NiMH battery module having high power combined with high energy density, high cycle life, good thermal management, and excellent gas recombination.

In still another embodiment of the present invention there is provided a hybrid electric vehicle drive system comprising a fuel cell and at least one nickel metal hydride battery module used alone or in combination for powering an electric motor, the at least one nickel metal battery module having a peak power density in relation to energy density as defined by the following expression:

$$P > 1,375 - 15E$$

where P is the peak power density as measured in Watts/kilogram and E is the energy density as measured in Watt-hours/kilogram.

In still other embodiments, there is provided a hybrid electric vehicle incorporating an integrated propulsion system comprising: a power system with an alkaline fuel cell and an electric motor, a nickel metal hydride battery module configured for high power and coupled to the power system, and a power controlling means governing the series and/or parallel operation of the alkaline fuel cell and the electric motor at for powering the hybrid electric vehicle and providing for the charge and discharge of the nickel metal hydride battery module.

BRIEF DESCRIPTION OF THE DRAWINGS

FIG. 1, is a schematic representation of an embodiment of a series HEV system in accordance with the present invention.

FIG. 2, is a schematic representation of an embodiment of a parallel HEV system in accordance with the present invention.

FIG. 4 is a cross-sectional view of the fuel cell of FIG. 3.

FIG. 5 is a magnified cross sectional view of the fuel cell of FIG. 4.

DETAILED DESCRIPTION OF THE INVENTION

Figure 3:
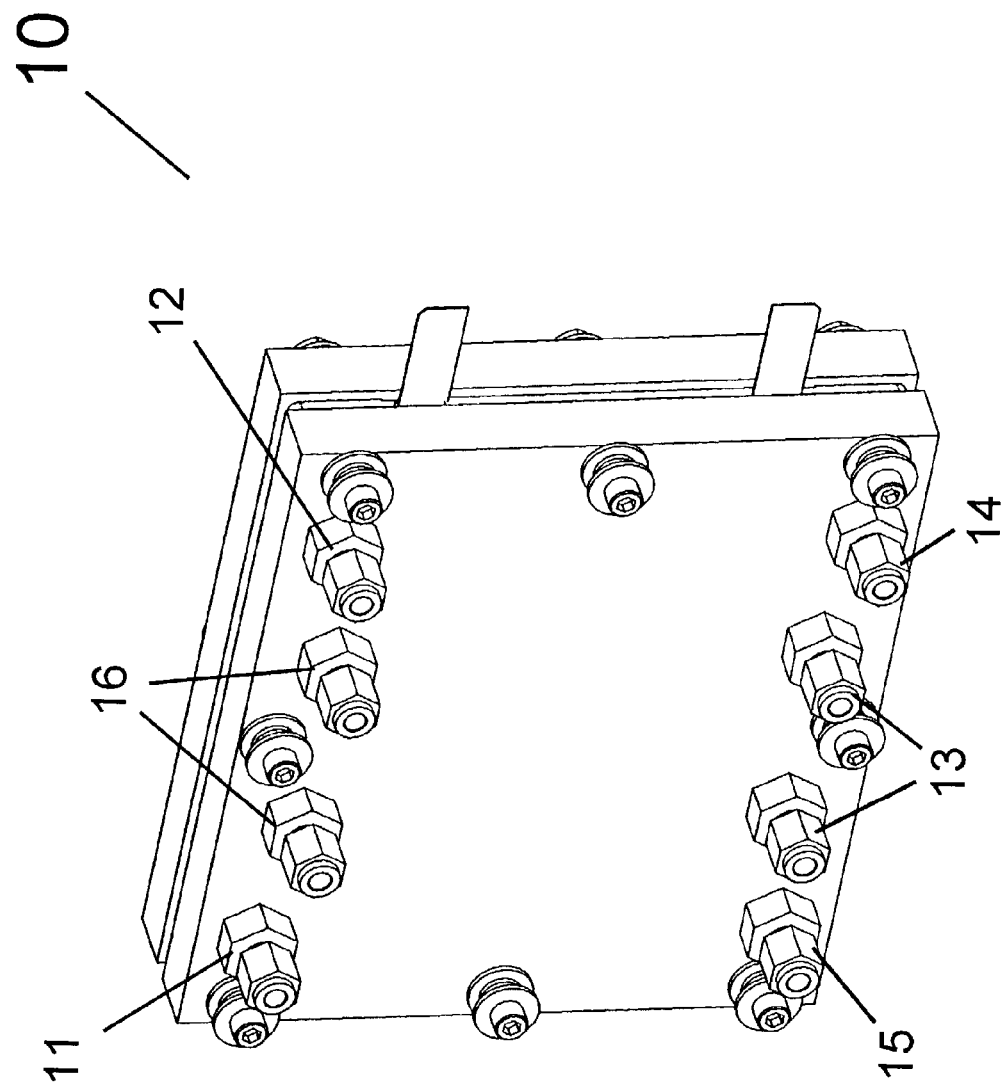
FIG. 3, is a frontal view of an embodiment of a fuel cell which can be used in a system in accordance with the present invention.
Figure 6:
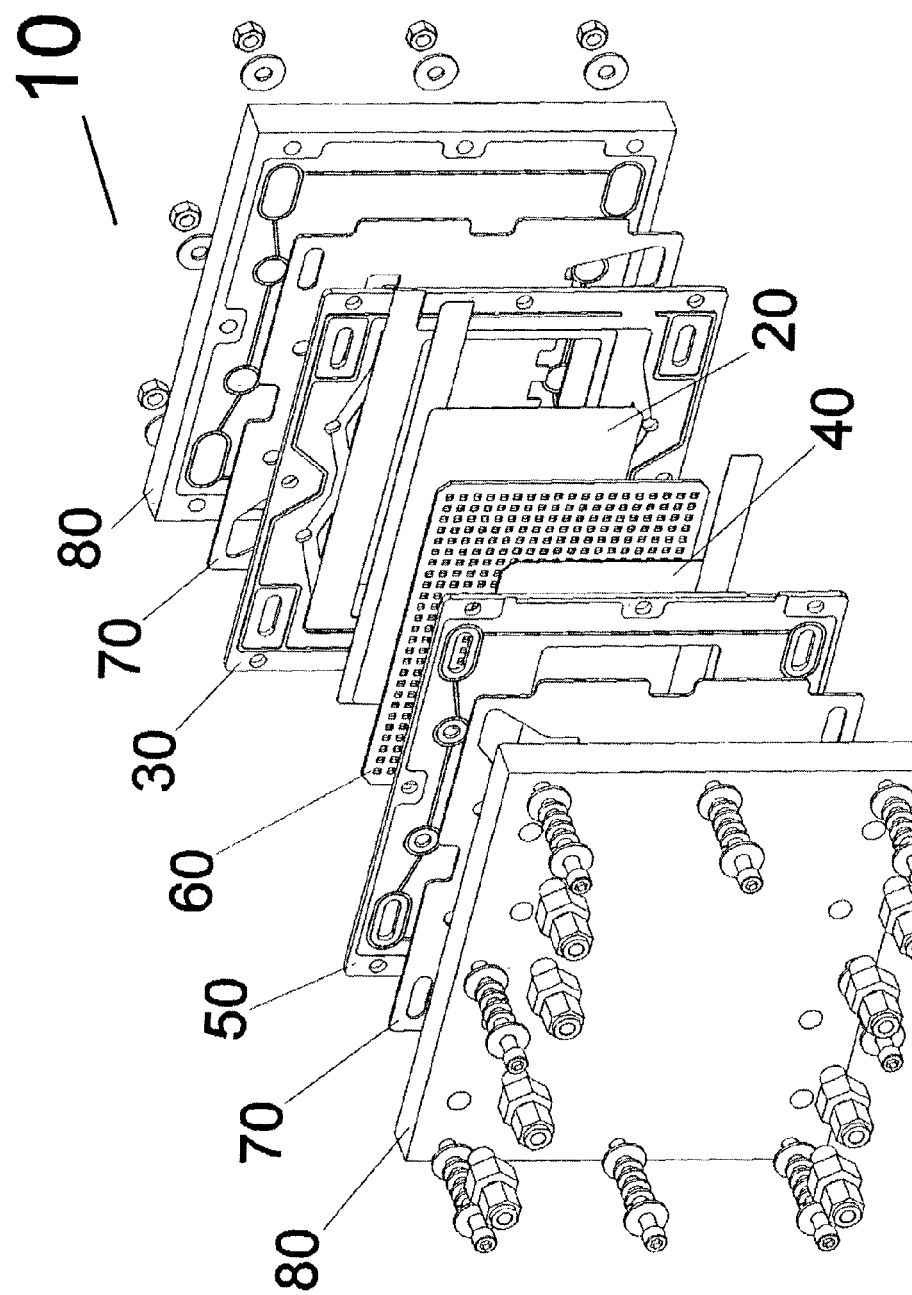
FIG. 6, is an exploded view of the fuel cell of FIG. 3.
Figure 7:
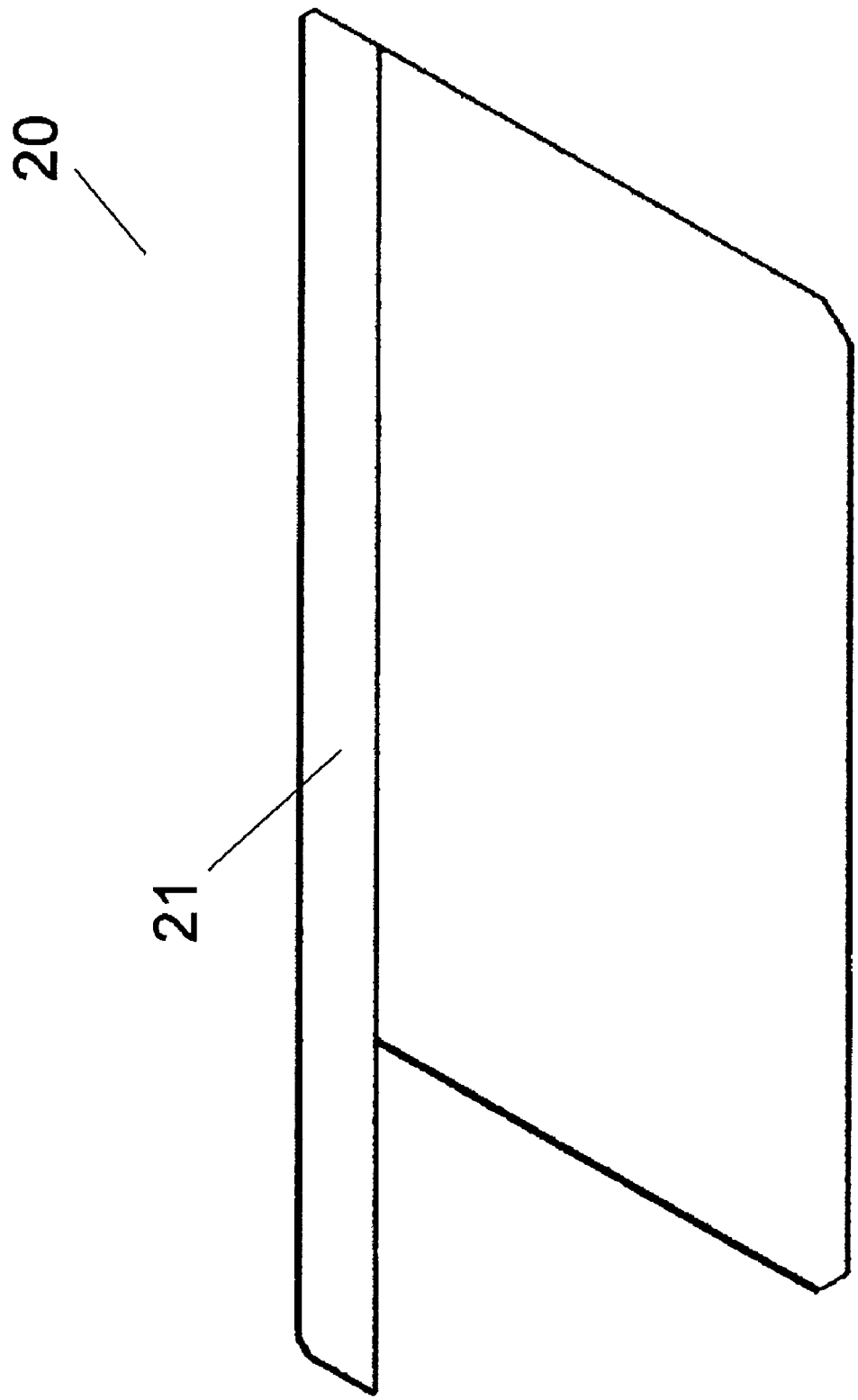
FIG. 7, is a perspective view of the fuel cell hydrogen electrode of FIG. 6.
Figure 8:
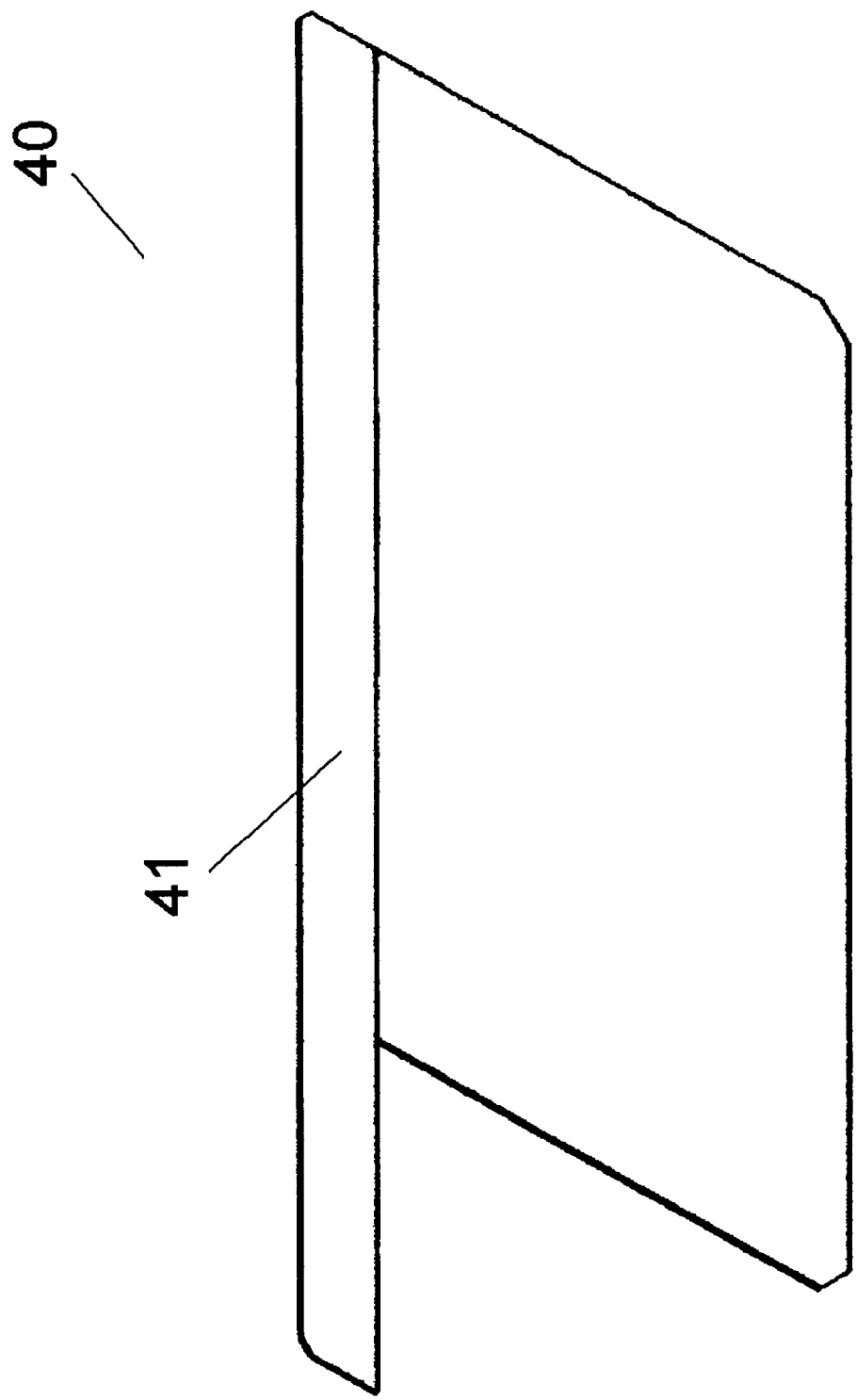
FIG. 8, is a perspective view of the fuel cell oxygen electrode of FIG. 6.
Figure 9:
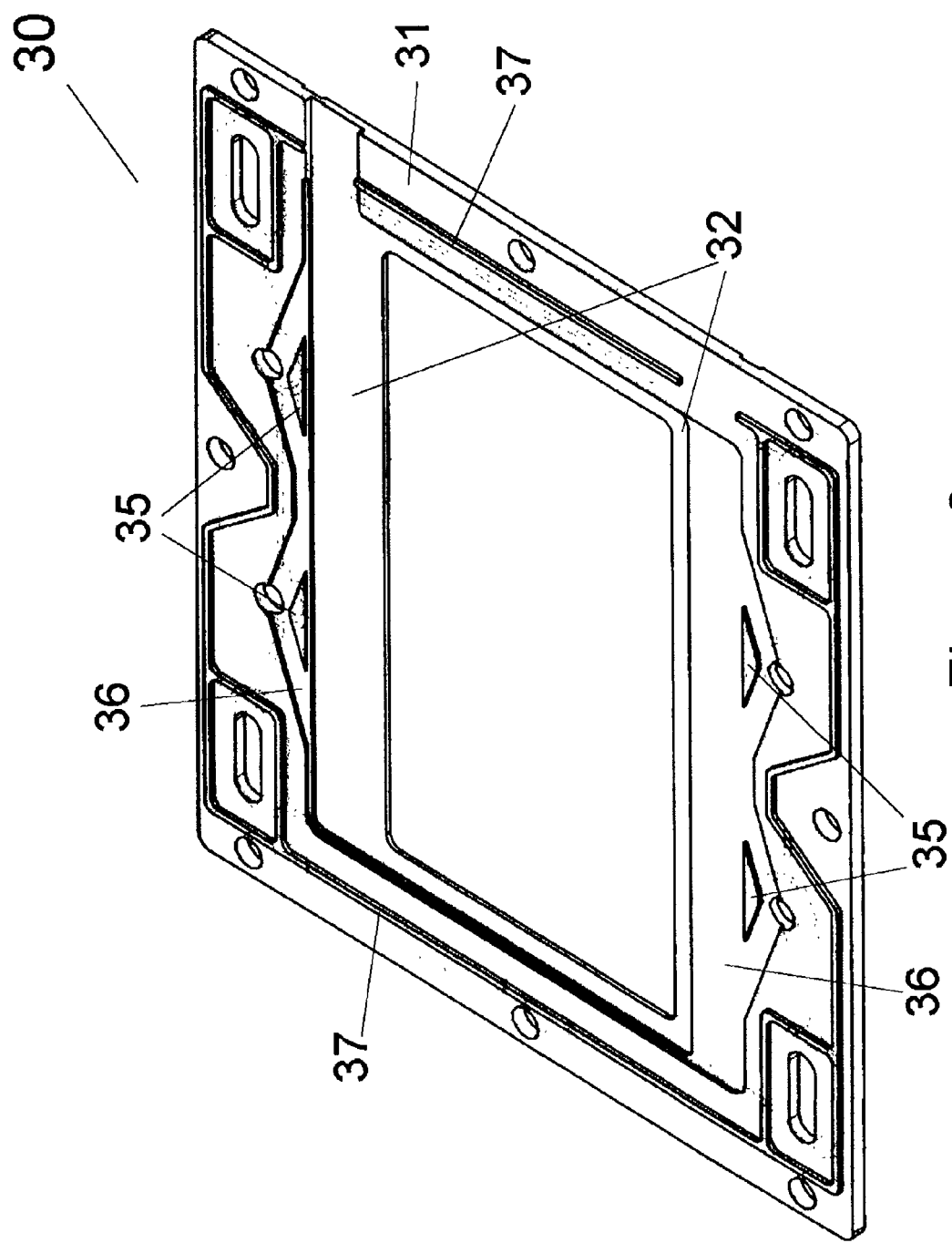
FIG. 9, is a perspective view of an embodiment of the inner side of the hydrogen electrode frame of FIG. 6.
Figure 10:
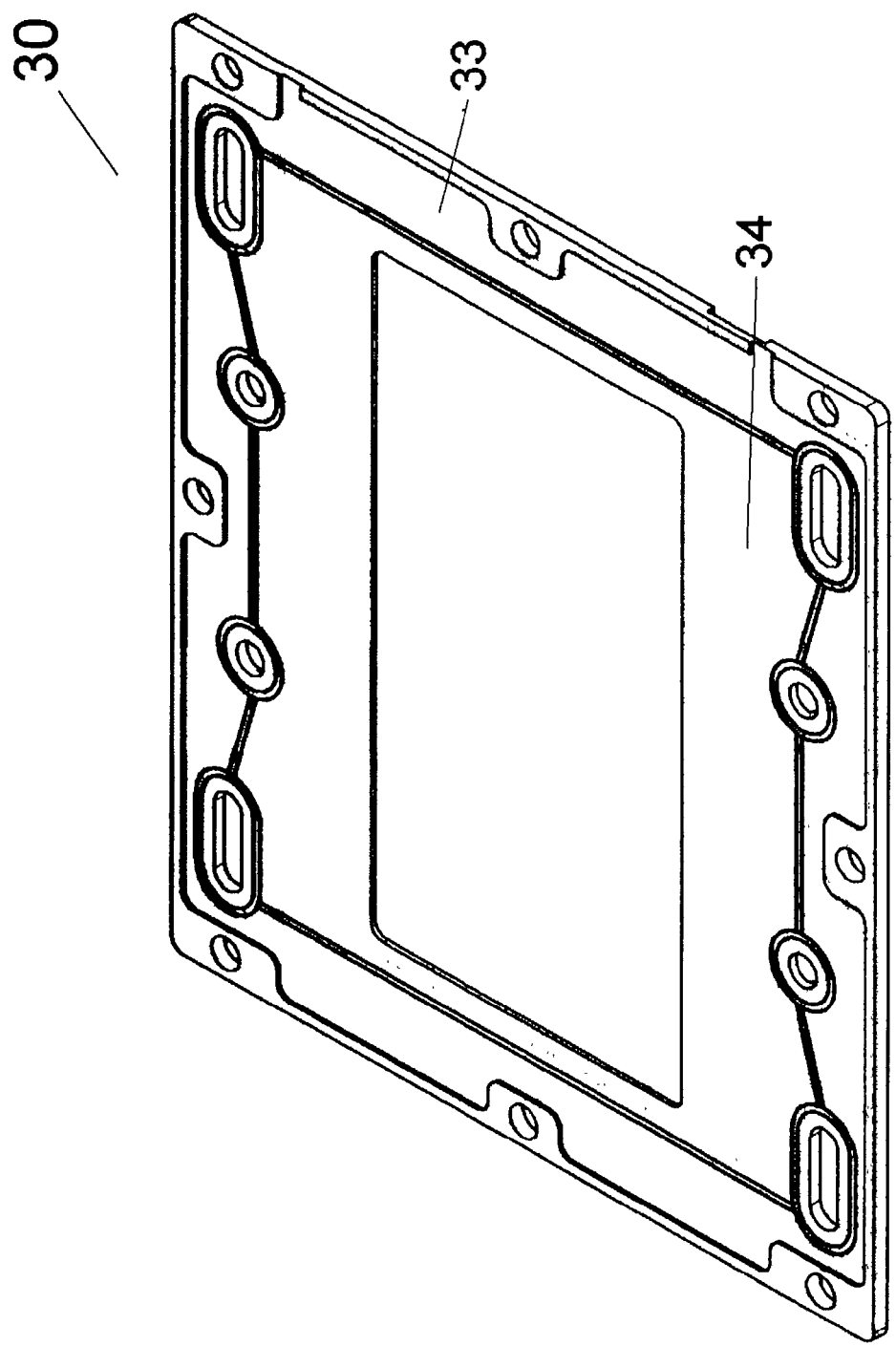
FIG. 10, is a perspective view of an embodiment of the outer side of the hydrogen electrode frame of FIG. 6.
Figure 11:
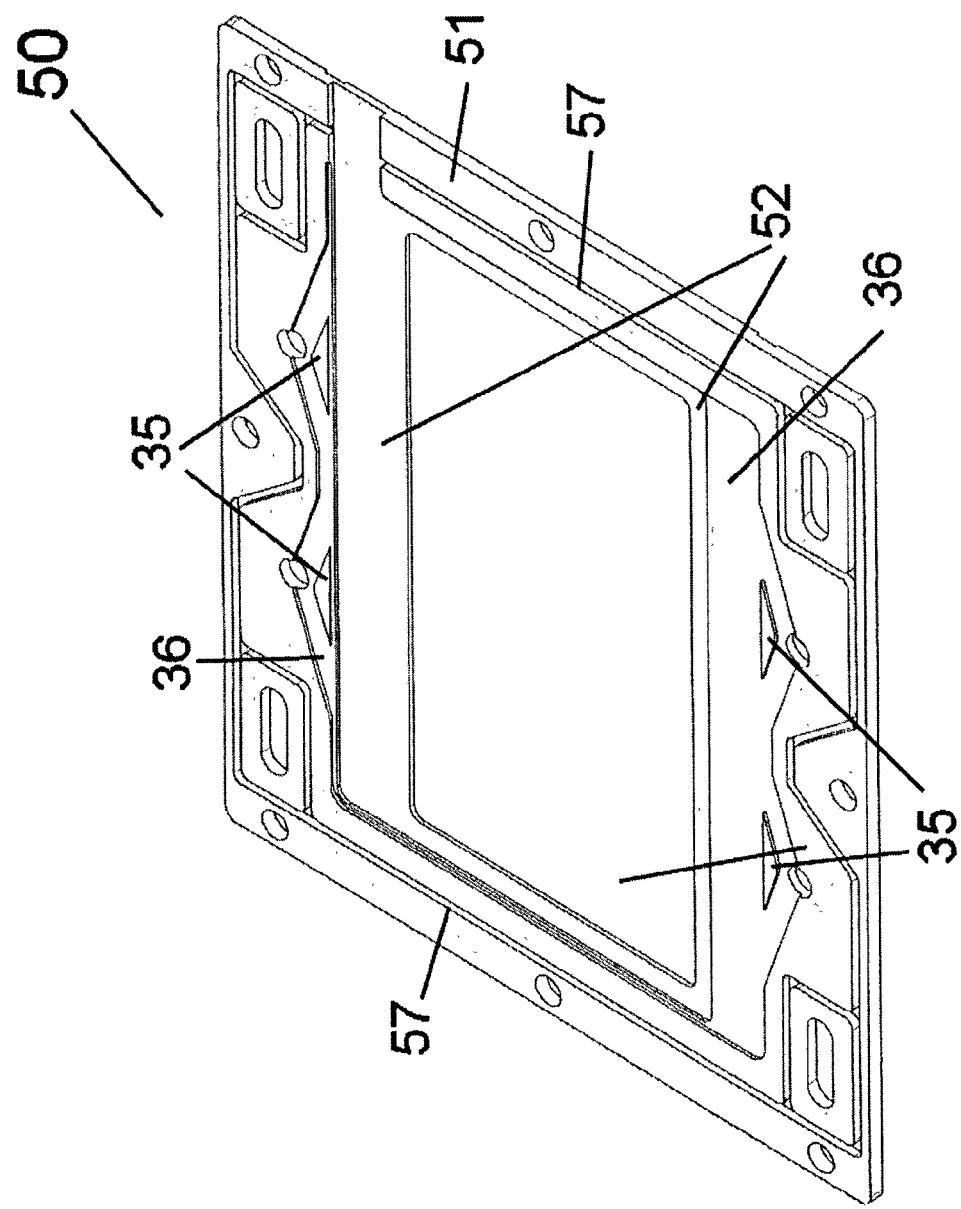
FIG. 11, is a perspective view of an embodiment of the inner side of the oxygen electrode frame of FIG. 6.
Figure 12:
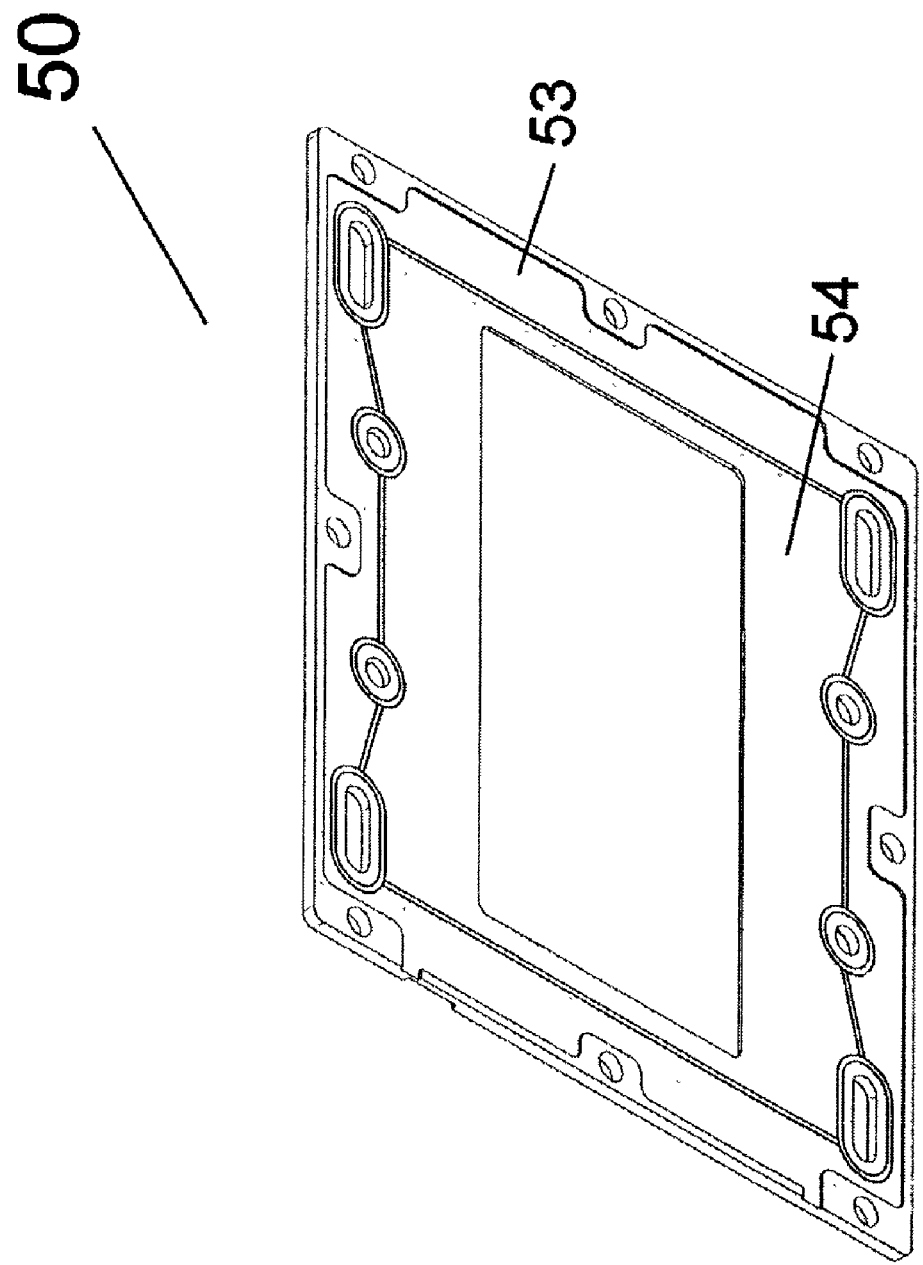
FIG. 12, is a perspective view of an embodiment of the outer side of the oxygen electrode frame of FIG. 6.
Figure 13:
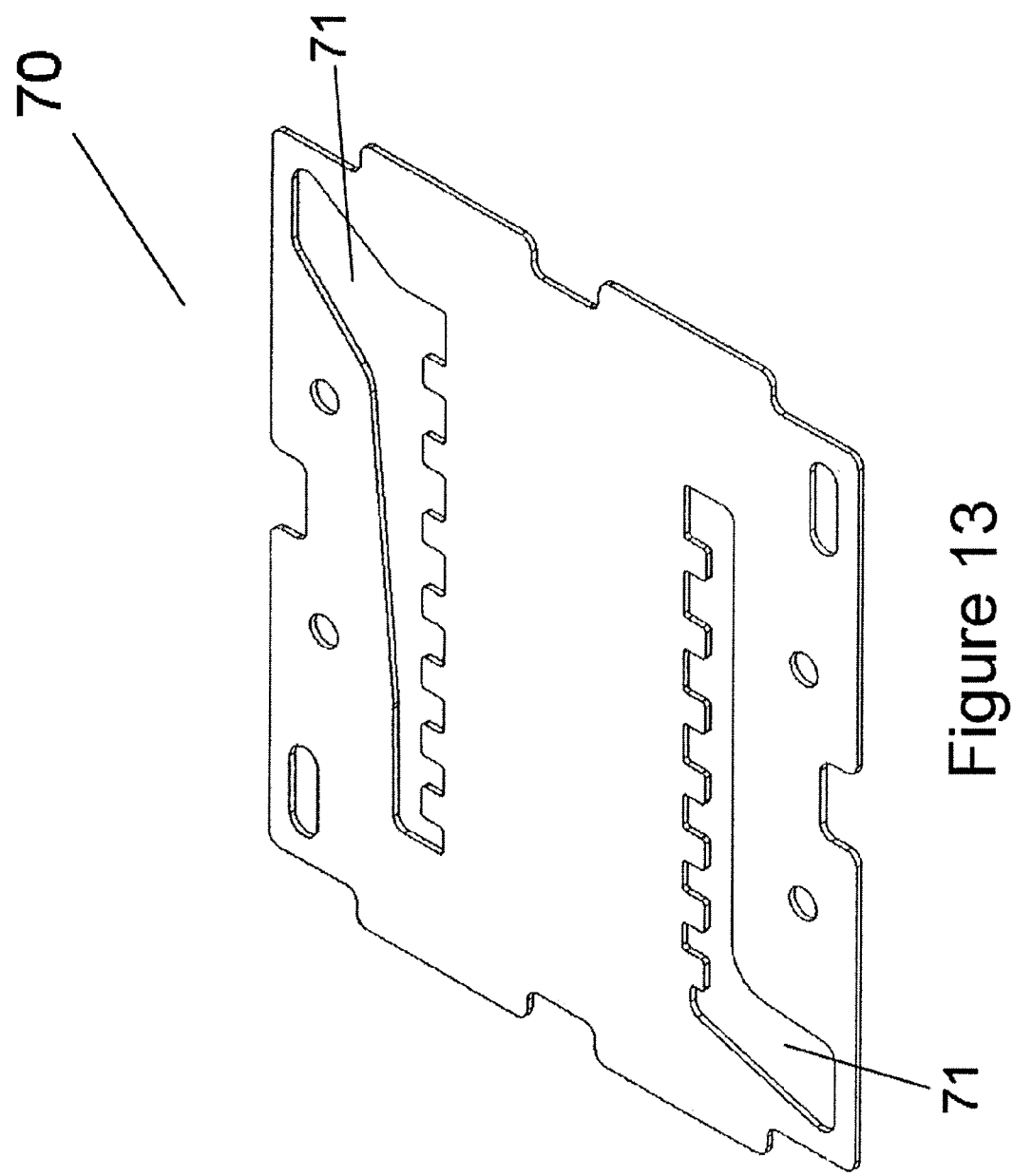
FIG. 13, is a perspective view of an embodiment of the compression plate of FIG. 6.
Figure 14:
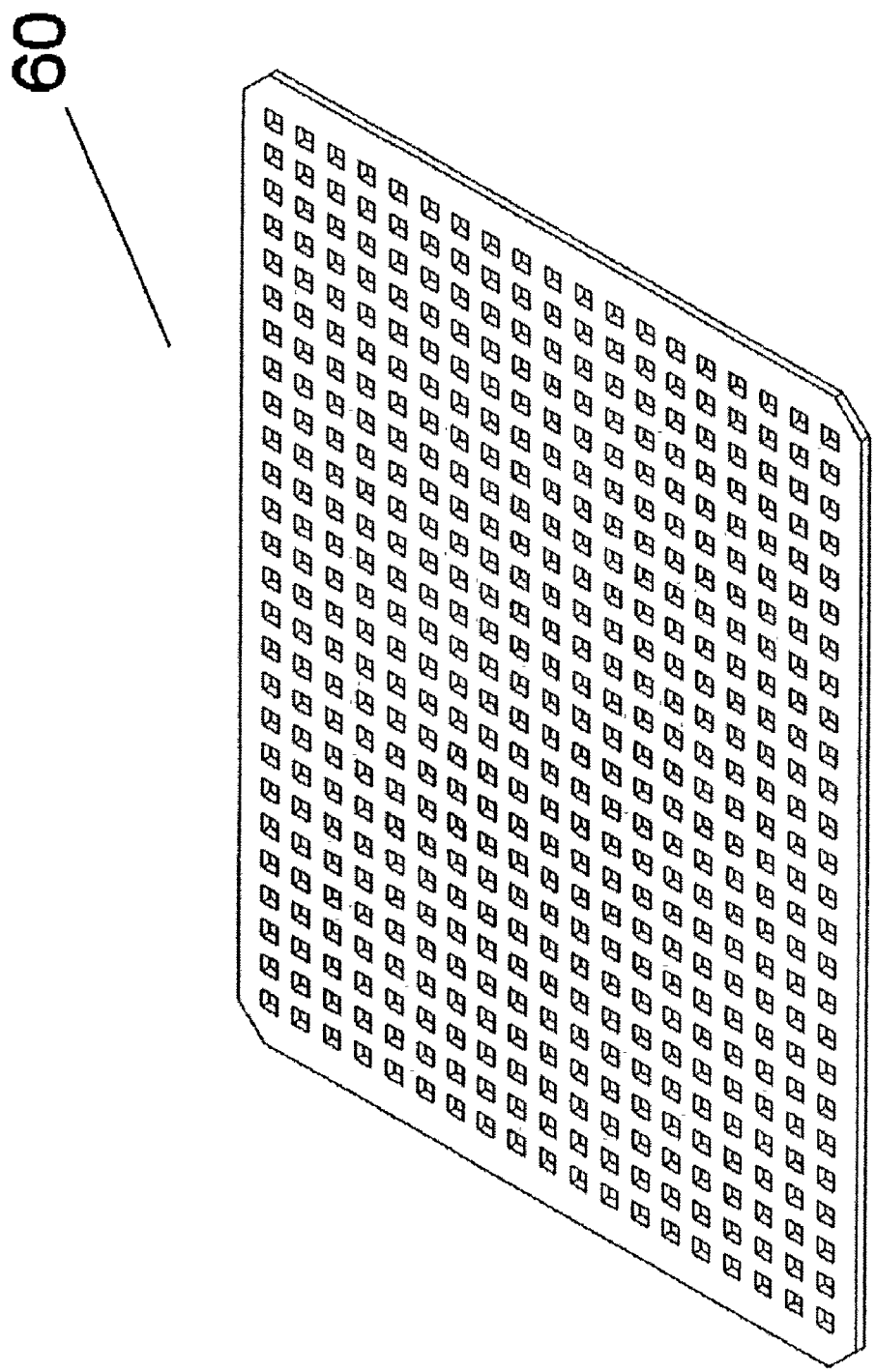
FIG. 14, shows a detailed cross sectional view of an embodiment of the electrolyte chamber of FIG. 6.

The present invention includes a vehicle propulsion system having a fuel cell, a metal hydride hydrogen storage unit which provides hydrogen to a fuel cell, a metal-hydride battery system, which may be the high power battery system disclosed herein below, and an electric motor which may be powered by the fuel cell, the metal-hydride battery system, or both.

Representative HEV systems in which the present invention is applicable includes those shown in schematic form in FIGS. 1 and 2. FIG. 1 shows a series HEV system in which a fuel cell is connected to a battery. The fuel cell is used to charge a battery which supplies electrical power to an electric motor. This electric motor is connected to the vehicle drive system which supplies drive power to the vehicle wheels.

The battery may be initially charged from a separate power source, such as through an outlet connected to a public utility system. The battery may also be charged by regenerative braking during application of the brakes.

In a parallel type system such as the one shown in FIG. 2, a battery and a fuel cell are each connected to supply electrical power to an electric drive motor which propels the hybrid electric vehicle. The vehicle can be powered by either the fuel cell or by the battery, or both the fuel cell and battery.

Parallel type systems, such as the one shown in FIG. 2 may also be operated in either the charge sustaining or charge depleting mode as explained above. As shown in the diagram of FIG. 2, power generated during braking may be utilized to provide recharging power to the battery. Other connections may also be provided to adapt the fuel cell for recharging the battery.

The fuel cell may also be used to provide both power and recharging. For example, in the a "series-parallel" HEV system, sometimes referred to as a "dual mode" system, a power splitter may be used to direct some of the power generated by the fuel cell to provide recharging power for the battery.

A power controlling means can be used to govern operation of the fuel cell and the electric motor at high efficiency for powering the hybrid electric vehicle and providing for the charge and discharge of said nickel metal hydride batteries. The power controlling means may be any device used to control the flow of reactants in the fuel cell, the temperature of the fuel cell and the pressure within the fuel cell. Preferably, the power controlling means is a solid state integrated microelectronic device. The power controlling means may also include algorithms that incorporate appropriate sensors and self-regulating and self-adjusting subroutines. These permit constant adjustment of control parameters to attain high efficiency based on one or more external factors, such as average driving speed, frequency of stops, ambient temperature, etc., as well as system factors such as engine temperatures, charge/discharge times and rates, battery temperatures, fuel consumption, etc.

The fuel cell as used in accordance with the present invention is preferably an alkaline fuel cell, however, other fuel cells such as a P.E.M. fuel cell, a molten carbonate fuel cell, a direct methanol fuel cell, a phosphoric acid fuel cell, and a solid oxide fuel cell may be substituted for or used in combination with the alkaline fuel cell. The utilization of a molten carbonate fuel cell or a solid oxide fuel cell, however, may not be best suited for application within a vehicle due to relatively high operating temperatures (600° C.-1000° C.).

Various views of an embodiment of a fuel cell as used in accordance with the present invention are shown in FIGS. 3-18. The layers of the fuel cell 10 have multiple ports through which oxygen, hydrogen, and electrolyte solution flow. When the layers are stacked and pressed together, the holes of each layer line up to allow uninterrupted flow throughout the cell. The fuel cell has a hydrogen inlet 11, an oxygen inlet 12, two electrolyte inlets 13, a hydrogen outlet 14, a oxygen outlet 15, and two electrolyte outlets 16. Hydrogen flows into the fuel cell through the hydrogen inlet 11 to the hydrogen electrode. The hydrogen is distributed across the hydrogen contacting side of the hydrogen electrode and is absorbed by the hydrogen electrode with any excess hydrogen flowing out of the fuel cell through the hydrogen outlet 14. The excess hydrogen may be used to help remove heat generated by the absorption of hydrogen from the fuel cell. Oxygen or an oxygen containing mixture, such as air, flows into the fuel cell through the oxygen inlet 12 to the oxygen electrode. Oxygen is distributed across the oxygen contacting side of the oxygen electrode where it is reduced by the oxygen electrode. Any unconsumed oxygen along with any mixture gases such as nitrogen then flows out of the fuel cell through the oxygen outlet 15. An oxygen outlet 15 may not be needed when pure oxygen is used as the oxygen source. Such a system may be configured to consume all the oxygen input. If air is used as the oxygen source, the air can be directed to flow across the oxygen electrode where the oxygen is absorbed. Any remaining nitrogen, carbon dioxide, or other gases left from the air stream flow out of the fuel cell through the oxygen outlet. The remaining air may also be used to help remove heat from the fuel cell. Electrolyte solution may be supplied to the fuel cell through one or more electrolyte inlets leading to the electrolyte chamber.

The electrolyte solution may be distributed through the electrolyte chamber and contact the hydrogen and oxygen electrodes. After the electrolyte solution contacts electrodes, the electrolyte solution flows out of the fuel cell through the electrolyte outlets 16. The exiting electrolyte solution may also be used to help remove heat produced from operation of the fuel cell.

The fuel cell has a stack formation with multiple layers. The fuel cell contains at least one hydrogen electrode 20 and at least one oxygen electrode 40. The hydrogen electrode 20 may be disposed in a hydrogen electrode frame 30 and the oxygen electrode may be disposed in an oxygen electrode frame 50. An electrolyte chamber 60 may be placed between the hydrogen electrode 20 and the oxygen electrode 40. The oxygen electrode frame and the hydrogen electrode frame may be adhered together to form an electrode chamber containing the hydrogen electrode 20, the oxygen electrode 40, and the electrolyte chamber 60. Rubber compression plates 70 may be placed outside the hydrogen electrode frame 30 and the oxygen electrode frame 50, and electrode end plates 80 may be placed outside the rubber compression plates 70 to complete the stack. The electrode end plates 80 are preferably bolted together to provide mechanical support and compression to the fuel cell, however other methods of securing the multiple layers of the fuel cell may be used as well.

The embodiment of the fuel cell just described is easily expandable by addition of electrode chambers as dictated by design requirements. In such case, additional hydrogen electrodes, oxygen electrodes, electrolyte chambers, frames, and compression plates may be added. The layers may be positioned as earlier described with respect to one another.

Each fuel cell includes at least one hydrogen electrode. The hydrogen electrode may be substantially rectangular in shape. An aspect ratio of 1 to 1 for the hydrogen electrode is preferred to better accommodate electrode expansion, current distribution, and current collection, however, other aspect ratios may be used in accordance with the present invention. The hydrogen electrode may be composed of a hydrogen storage alloy. The hydrogen electrode is preferably flat with a current collector 21 running along one of the longer sides of the hydrogen electrode 20. The current collector 21 may be in electrical communication with the hydrogen electrode 20.

Each fuel cell also contains at least one oxygen electrode 40. The oxygen electrode may be substantially rectangular in shape. An aspect ratio of 1 to 1 for the oxygen electrode is preferred to optimize current distribution and current collection, however, other aspect ratios may be used in accordance with the present invention. The oxygen electrode is preferably flat with a current collector 41 running along one of the longer sides of the oxygen electrode. The current collector 41 may be in electrical communication with the oxygen electrode 40.

The hydrogen electrode 20 may be placed in a hydrogen electrode frame 30 and the oxygen electrode 40 may be placed in an oxygen electrode frame 50. In such embodiments, each frame has an inner side and an outer side. The inner side 31 of the hydrogen electrode frame 30 may have has a depression 32 into which the hydrogen electrode 20 fits and the inner side 51 of the oxygen electrode frame 50 may have a depression 52 into which the oxygen electrode 40 fits. The depression in the hydrogen electrode frame 32 and the depression in the oxygen electrode frame 52 may be slightly larger than the electrodes thereby allowing for electrode expansion during operation of the fuel cell. Once the hydrogen electrode 20 and the oxygen electrode 40 are placed in their respective frames, an electrolyte chamber 60 may be placed between the hydrogen electrode 20 and the oxygen electrode 40 and the frames may be adhered together to form an electrode chamber. The outer side 33 of the hydrogen electrode frame 30 may have a depression 34 into which a rubber compression plate 70 fits and the outer side 53 of the oxygen electrode frame 50 may have a depression 54 into which a second compression plate 70 fits. The thickness of the compression plate 70 may be greater than the depth of the depression in the outer side of the hydrogen electrode frame 34 and the depression in the outer side of the oxygen electrode frame 54 to provide mechanical support and proper sealing within the fuel cell 10. The compression plates 70 may also have cutouts, which provide flow channels 71 for hydrogen and oxygen when placed into the fuel cell.

The inner side of the hydrogen electrode frame and the oxygen electrode frame may also have flow distributing structures 35 located within electrolyte flow channels 36 providing even distribution of electrolyte solution through the electrolyte chamber. The use of the flow distributing structures eliminates the need for manifolds while maintaining low pressure throughout the fuel cell. The flow distributing structures 35 may also provide mechanical support to the fuel cell. The flow distributing structures 35 may be located where the electrolyte solution enters the electrolyte chamber. The flow distributing structures 35 preferably have a triangular shape, however other circular or polygonal shapes may be used in accordance with the present invention. In one embodiment of the present invention, the oxygen electrode frame and the hydrogen electrode frame together form the flow distributors 35. In this embodiment, one half of the flow distributors protrude from each frame and when the frames are pressed together the halves line up and form the flow distributors. The flow distributors thereby extend from the hydrogen electrode frame 30 to the oxygen electrode frame 50 and force the electrolyte solution to flow around them, thereby evenly distributing the electrolyte solution between the hydrogen and oxygen electrode.

The hydrogen electrode frame and the oxygen electrode frame may be substantially similar, however, the hydrogen electrode frame 30 may have a tongue 37 along its edge and the oxygen electrode frame may have a groove 57 along its edge into which the tongue fits. This tongue and groove design allows uniform assembly of the fuel cell and provides an area for epoxy or another adhering substance to be placed for securing the two frames.

Compression plates 70 may be inserted into the fuel cell to absorb volumetric expansion of the electrodes, distribute hydrogen and oxygen across the respective electrodes, and help maintain mechanical support of the fuel cell stack. The compression plates may be placed in contact with the outer sides of the hydrogen electrode frame and the oxygen electrode frame. The compression plates 70 preferably have cutout sections 71 which form the flow channels in the fuel cell. Compression plates without the cutouts may be used as well, however, flow channels for hydrogen and oxygen will need to be included inside the fuel cell to allow for hydrogen and oxygen to contact the respective electrodes. The flow channels formed in the compression plates are configured to evenly distribute hydrogen or oxygen across the respective electrode. In one embodiment of the present invention, the compression plates are located between the electrode end plates and the electrode frames. The compression plates are also designed to absorb expansion of the electrodes in the Z direction as the electrodes expand and contract as hydrogen and oxygen are absorbed and reacted by the respective electrodes. The compression plates may be constructed from any rubber type material, however the rubber material must be able to withstand the environment within the fuel cell.

Electrolyte chambers may be used to maintain mechanical support within the fuel cell while creating an electrolyte flow field which allows the electrolyte solution to contact the electrodes. The electrolyte chambers 60 may be composed of an expanded polyolefin sheet optionally having a thin membrane on each side. The membranes help prevent excess electrolyte from contacting the electrodes and also prevents hydrogen or oxygen from penetrating into the electrolyte solution. The electrolyte chamber 60 may be placed between the hydrogen electrode and the oxygen electrode in the fuel cell. The electrolyte chamber may be in direct contact with the electrodes. While the electrolyte chamber is preferably constructed from an expanded polyolefin sheet, any porous material that allows unrestricted flow throughout its structure while maintaining mechanical support of the fuel cell may be substituted. The porous material must also be able to withstand the environment within the fuel cell. Inside the electrolyte chamber, the electrolyte solution contacts the hydrogen electrode and the oxygen electrode. The electrolyte solution enters the fuel cell and flows through the electrolyte chamber. After passing through the electrolyte chamber, the electrolyte solution flows out of the fuel cell.

The hydrogen electrode is generally composed of materials which have inherent catalytic activity as well as hydrogen storage capacity and the oxygen electrode is generally composed of materials which provide for the dissociation of oxygen and have catalytic activity toward the reduction of oxygen. The oxygen electrode and hydrogen electrode materials do not include any noble metals, and are therefore inherently low cost. The oxygen electrode and hydrogen electrode materials are robust and long-lived, being poisoning resistant. The hydrogen electrode does not utilize the carbon substrates of the prior art. While a detailed discussion of the instant electrodes and their utilization in an alkaline fuel cell is described herein below, it should be noted that the concepts of the instant invention can be applied to other types of fuel cells, such as P.E.M. fuel cells.

The hydrogen electrodes of the present invention are composed of a hydrogen storage alloy which has excellent catalytic activity for the formation of atomic hydrogen from molecular hydrogen, outstanding catalytic activity toward the formation of water from hydrogen ions and hydroxyl ions, and has exceptional corrosion resistance toward the alkaline electrolyte of an alkaline fuel cell.

Figure 15:
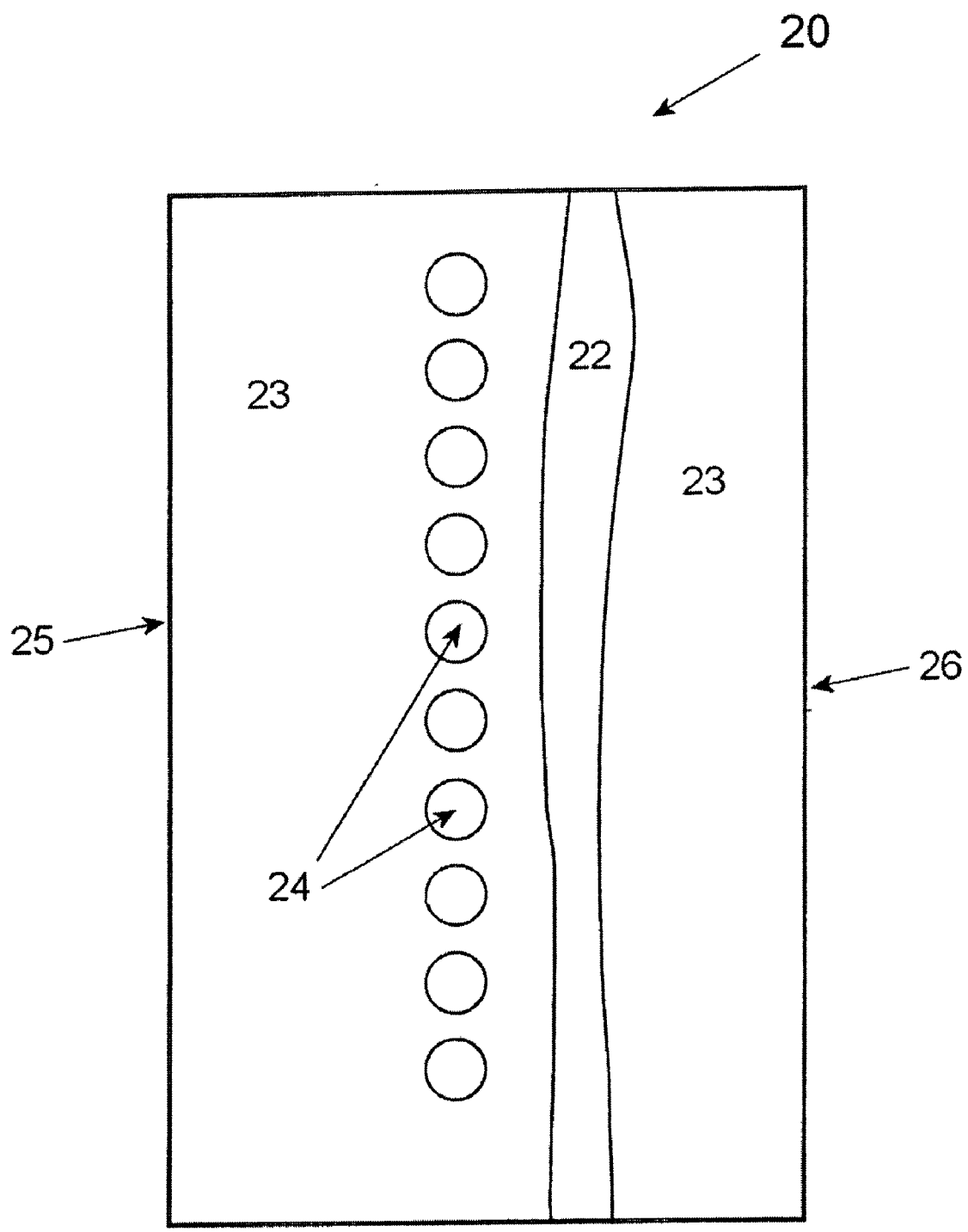
FIG. 15, is a cross sectional view of an embodiment of the fuel cell hydrogen electrode of FIG. 6.

The hydrogen electrode 20 includes a hydrophobic component 22 (such as polytetrafluoroethylene (PTFE)), and a hydrogen storage material/anode active material component 23. While FIG. 15 shows the hydrophobic component 22 and the active electrode material component 23 as separate layers of material within the hydrogen electrode 20, they may also be intimately mixed into a single material. The hydrogen electrode 20, also includes a substrate component 24, which minimally acts as a current collector, but may also provide a support function. This substrate component is discussed herein below.

The hydrogen electrode 20 has two surfaces 25 and 26. One surface 25 is adjacent a hydrogen stream when incorporated into the fuel cell, while the other surface 26 is adjacent an aqueous alkaline electrolyte, preferably a potassium hydroxide solution. As stated above, the hydrophobic (PTFE) component 22 may either be a layer within the hydrogen electrode or intimately mixed within the hydrogen electrode 20. In either case, the purpose of the hydrophobic (PTFE) material is to act as a water barrier, preventing water from escaping from the aqueous alkaline electrolyte of the fuel cell, while at the same time, allowing hydrogen to pass from the source thereof to the electrode material. Thus, a portion of the hydrogen electrode, surface 26 (and somewhat interiorly from the surface,) is in close proximity to the electrolyte and acts to oxidize hydrogen (providing electrons), while the remainder of the anode active material (including surface 25) provides for dissociation of molecular hydrogen and storage of the dissociated hydrogen for later oxidation at surface 26.

Preferably, the hydrogen storage alloy is one which can reversibly absorb and release hydrogen irrespective of the hydrogen storage capacity and has the properties of a fast hydrogenation reaction rate, a good stability in the electrolyte, and a long shelf-life. It should be noted that, by hydrogen storage capacity, it is meant that the material stores hydrogen in a stable form, in some nonzero amount higher than trace amounts. Preferred materials will store about 0.1 weight % hydrogen or more. Preferably, the alloys include, for example, rare-earth/Misch metallic alloys, zirconium, and/or titanium alloys, or mixtures thereof.

The instant inventors have found that certain hydrogen storage materials are exceptionally useful as alkaline fuel cell anode active materials. These useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the hydrogen electrode; 2) as a water formation catalyst, forming water from hydrogen and hydroxyl ions (from the aqueous alkaline electrolyte) at surface 26, of the hydrogen electrode; and 3) as an internal hydrogen storage buffer to insure that a ready supply of hydrogen ions is always available at surface 26 (this capability is useful in situations such as fuel cell startup and regenerative energy recapture, discussed herein below)

Specific alloys which may be useful as the anode active material are alloys that contain enriched catalytic nickel regions of 50-70 Angstroms in diameter distributed throughout the oxide interface which vary in proximity from 2-300 Angstroms preferably 50-100 Angstroms, from region to region. As a result of these nickel regions, the materials exhibit significant catalysis and conductivity. The density of Ni regions in the alloy of the '591 patent provides powder particles having an enriched Ni surface. The most preferred alloys having enriched Ni regions are alloys having the following composition:

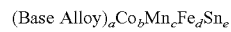

$$(\text{Base Alloy})_a Co_b Mn_c Fe_d Sn_e$$

where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

The substrate component 24 acts as an electrical conductor and may also act as a support means. For example, if a powdered electrically conductive material, such as nickel, nickel alloy, copper, copper alloy or carbon, is mixed into the active material 23 then the material acts as an electrically conductive material, but does not provide any support for the electrode materials per se.

Preferably, the substrate component 24 acts as both an electrical conductor and a support structure. The electrode may be formed by pressing anode active material into a porous metal substrate. The conductivity of the electrode can be increased by increasing the conductivity of the electrode's porous metal substrate. Generally the porous metal substrate may be composed of, but is not limited to, meshes, grid, matte, foil, foam, plate, expanded metal, and combinations thereof. Preferably, the porous metal substrate used for the electrode is a mesh, grid, foam, or expanded metal. The substrate may be formed from any material which is electrically conductive and resistant to corrosion or chemical attack from the electrolyte. Nickel or nickel alloy is a very good material, but for high power applications, nickel may be too resistive. Thus when high power is required, the substrate may be formed from copper, copper-plated nickel, or a copper-nickel alloy, as taught by U.S. Pat. Nos. 5,856,047 (Venkatesan, et al.) and 5,851,698 (Reichman et al.), the disclosures of which are hereby incorporated by reference. As used herein, "copper" refers to either pure copper or an alloy of copper, and "nickel" refers to either pure nickel or an alloy of nickel. Using copper to form the porous metal substrate of the electrode has several important advantages. Copper is an excellent electrical conductor. Hence, its use as a substrate material decreases the resistance of the hydrogen electrode. This decreases the amount of fuel cell power wasted due to internal dissipation, and thereby provides a fuel cell having increased output power. Copper is also a malleable metal. Increased substrate malleability allows the substrate to more reliably hold the active hydrogen storage material that is compressed onto the substrate surface. This lessens the need to sinter the electrode after the active material has been compressed onto the substrate, thereby simplifying and reducing the cost of the hydrogen electrode manufacturing process.

The hydrogen electrodes as used in accordance with the present invention may further include a catalytic material in addition to the hydrogen storage alloy. The catalytic material enhances the dissociation of molecular hydrogen into atomic hydrogen and/or the formation of water molecules from hydrogen ions and hydroxyl ions. Such a catalytic material may be especially useful in the hydrogen electrode anode active material for a high-powered, instant start-up fuel cell.

The addition of such catalytic material is based upon a unique approach to catalysis. This approach involves the design of multicomponent disordered materials having tailor-made local structural chemical environments which yield desirable catalytic characteristics. The hydrogen electrodes are designed to have a high density of active sites, resistance to poisoning, and long operating life to provide efficient low cost fuel cell operation. The manipulation of local structural and chemical environments to provide catalytically active sites is made possible by utilization of a host matrix which is, in accordance with the present invention, structurally modified with at least one modifier element to create a spectrum of bonding arrangements to provide a greatly increased density of catalytically active sites. With a greater density of catalytically active sites, the hydrogen dissociation and/or oxidation reactions occur much more readily to allow more efficient reaction and hence reduce operating costs of, for instance, a fuel cell.

The increased number of catalytically active sites not only increases the energy output for a given amount of hydrogen, but enables the materials to be more resistant to poisoning. This is because with catalytic materials of the present invention a certain number of catalytically active sites can be sacrificed to the effects of poisonous species while a large number of unpoisoned sites still remain to provide the desired catalysis. Also, some of the poisons are inactivated by being bonded to other sites without effecting the active sites.

The disordered catalytic materials of the present invention, unlike the specific and rigid structure of crystalline materials, are ideally suited for manipulation since they are not constrained by the symmetry of a crystalline lattice or by stoichiometry. By moving away from materials having restrictive crystalline symmetry it is possible by selectively modifying in accordance with the present invention to accomplish a significant alteration of the local structural chemical environments involved in hydrogen oxidation to enhance the catalytic properties of the anode active materials. The disordered materials of the present invention can be modified in a substantially continuous range of varying percentages of modifier elements. This ability allows the host matrix to be manipulated by the modifier elements to tailor-make or engineer materials with suitable catalytic characteristics. This is in contrast to crystalline materials which generally have a very limited range of stoichiometry available, thus a continuous range of control of chemical and structural modification of such crystalline materials is not possible.

In the disordered catalytic materials of the present invention, it is possible to attain unusual electronic configurations resulting from nearest neighbor interactions between lone pairs, microvoids, dangling bonds, and unfilled or vacant orbitals. These unusual electronic configurations can interact with the modifier elements of the present invention which are incorporated into the host matrix to readily modify the local structural chemical order and thus the electronic configurations of the matrix to provide numerous catalytically active sites.

Disorder of the modified material can be of an atomic nature in the form of compositional or configurational disorder provided throughout the bulk of the material or in numerous regions of the materials. The disorder can also be introduced into the material by creating microscopic phases within the material which mimic the compositional or configurational disorder at the atomic level by virtue of the relationship of one phase to another. For example, the disordered materials can be created by introducing microscopic regions of a different kind or kinds of crystalline phases, or introducing regions of an amorphous phase or phases in addition to regions of a crystalline phase or phases. The interfaces between these various phases can provide surfaces which are rich in local chemical environments providing numerous catalytically active sites.

A major advantage of the disordered materials as used in the hydrogen electrode is that they can be tailor-made to provide a very high density and variety of catalytically active sites relative to the materials based upon a crystalline structure. The types of structures which provide the local structural chemical environments for improved catalytic efficiency in accordance with the present invention include multicomponent polycrystalline materials lacking long range compositional order, microcrystalline materials, amorphous materials having one or more phases, or multiphase materials containing both amorphous and crystalline phases or mixtures thereof.

Modification of the host matrix element or elements to form the catalytic materials of the hydrogen electrode can be accomplished by a variety of methods. One type of formation involves vacuum deposition techniques, (i.e., sputtering, vapor deposition or plasma deposition). With these techniques, the catalytically active material of the present invention can be directly applied to the electrode surface. In these methods, the host matrix element or elements are co-deposited along with the modifier element or elements to form a layer of catalytic material on one or more surfaces of the hydrogen storage material of the electrode. The anode active material may even be layered such that the material on the hydrogen contacting surface 25 is formed from a material which has been specifically designed to be highly catalytic to the dissociation of molecular hydrogen into atomic hydrogen, while the material on electrolyte interface surface 26 is designed to be highly catalytic to the formation of water from hydrogen and hydroxyl ions.

In addition to depositing the disordered catalytic material of the hydrogen electrode on one or more surfaces of the hydrogen storage material, the catalytic material may also be continually graded from a high concentration on the surface to a lower concentration inward of the bulk of the hydrogen storage material. Also, the catalytic material may be continually graded or layered within the bulk of the hydrogen storage material. The thickness of this layering or grading may be anywhere from as thin as 30 or less Angstroms to as thick as 2 microns or more, depending upon the catalytic activity of the chosen material and the requirements of the end use (i.e. such as a fuel cell).

Alternative to depositing layers or grading on the surface of or within the bulk of the hydrogen storage material, the catalytic materials may also be deposited onto the surface of the hydrogen storage material particles. This affords an even higher degree of catalytic activity throughout the entire bulk of the hydrogen storage material. The coating on the storage particles does not even need to be completely continuous, and can be discontinuous on the particle surface, as long as the requisite catalytic function is served. The coatings can range from 20 to 150 Angstroms or so, depending, once again, upon the catalytic activity of the chosen material and the requirements of the final use.

The catalytic material of the instant invention is preferably a compositionally disordered non-equilibrium, multi-component, catalytic material, which includes a host matrix having least one transition element and incorporating at least one modifier element. The host matrix preferably includes nickel and the modifier element is preferably a transition element selected from the group consisting of Ti, Zr, Mo, V, Mg, Si and Al. The most preferred material is a Ni—Ti—Mo alloy such as those disclosed in U.S. Pat. No. 4,487,818 to Ovshinsky et al.

The hydrogen storage materials as earlier described with or without catalytic material are useful in fuel cells in general and more specifically to OVONIC™ instant start alkaline fuel cells. The OVONIC™ fuel cells have a built in reserve of hydrogen (within the hydrogen electrode) for instant startup (discussed herein below), and have the ability to accept the energy of regenerative braking by acting as an electrolyzer (discussed herein below). The fuel cell has increased efficiency and increased power capabilities as compared with conventional fuel cells of the prior art, while dramatically increasing the operating temperature range of the cell (−20 to 150° C.) The fuel cell is easy to assemble and has the advantage of utilizing proven, low cost production techniques.

The oxygen electrode as used in accordance with the present invention contains an active material component which is catalytic to the dissociation of molecular oxygen into atomic oxygen, catalytic to the formation of hydroxyl ions (OH$^-$) from water and oxygen ions, corrosion resistant to the electrolyte, and resistant to poisoning. A material which is useful as an active material in the oxygen electrode is one which includes a host matrix having at least one transition metal element which is structurally modified by the incorporation of at least one modifier element to enhance its catalytic properties. Examples of such materials are disclosed in U.S. Pat. No. 4,430,391 ('391) to Ovshinsky, et al., published Feb. 7, 1984, the disclosure of which is hereby incorporated by reference. Such a catalytic body is based on a disordered non-equilibrium material designed to have a high density of catalytically active sites, resistance to poisoning and long operating life. Modifier elements, such as La, Al, K, Cs, Na, Li, C, and O structurally modify the local chemical environments of the host matrix including one or more transition elements such as Mn, Co and Ni to form the catalytic materials of the oxygen electrode. These low over-voltage, catalytic materials increase operating efficiencies of the fuel cells in which they are employed.

The oxygen electrode is formed the same as conventional oxygen electrodes which use platinum catalysts, but the non-noble-metal catalysts described above are substituted for the platinum. The non-noble catalysts are finely divided and disbursed throughout a porous carbon matte-like material. The material may or may not have a conductive substrate as needed. If used the substrate can be as described herein above.

When the instant fuel cell is run in reverse, as an electrolyzer, during an energy recapture process such as regenerative braking, water is electrolyzed into hydrogen and oxygen. For example, when electric powered vehicles are used in stop and go mode in inner cities, regenerative braking systems can recapture kinetic energy, and convert it to electrical energy. In this mode, the electric motors reverse their roles and become generators using up the kinetic energy of the motion. This causes a spike of current which amounts to about 10% of the normal operating load. A conventional fuel cell (alkaline or P.E.M.) cannot accept such surges. This feedback of energy would cause rapid hydrogen and oxygen evolution which would cause the catalysts to lose their integrity and adhesion thereby undermining the overall system performance.

In the fuel cell as used in accordance with the present invention, this will not be a problem, because the hydrogen electrode will take the surge current and become charged with the produced hydrogen. However, the oxygen electrode will evolve oxygen. While this will be less of a problem with the Ovonic non-noble-metal catalyst electrodes, the problem will nevertheless exist. Two alternative solutions to this problem may be employed to alleviate this problem. The first is to provide a third electrode, in parallel with the oxygen electrode, that will take the surges of current, harmlessly evolving oxygen. This electrode will need to be of high surface area, but need not necessarily be porous. Since this third electrode is the one that evolves oxygen, there is no longer any worry about oxidizing the carbon matte in the fuel cell's oxygen electrode. The second option is to provide an OVONIC™ oxygen evolution catalyst coating on the edges or frame of the current collector or substrate of the oxygen electrode. This catalyst will have a more favorable oxygen overvoltage when compared to the non-noble metal containing carbon substrate used for oxygen evolution. As a result, when there is a surge of current, the oxygen evolution will preferentially take place on the catalyst coated frame thus sparing the oxygen electrode from evolving oxygen. Also the oxygen reduction catalyst can be tailored not to be an oxygen evolution catalyst.

Figure 16:
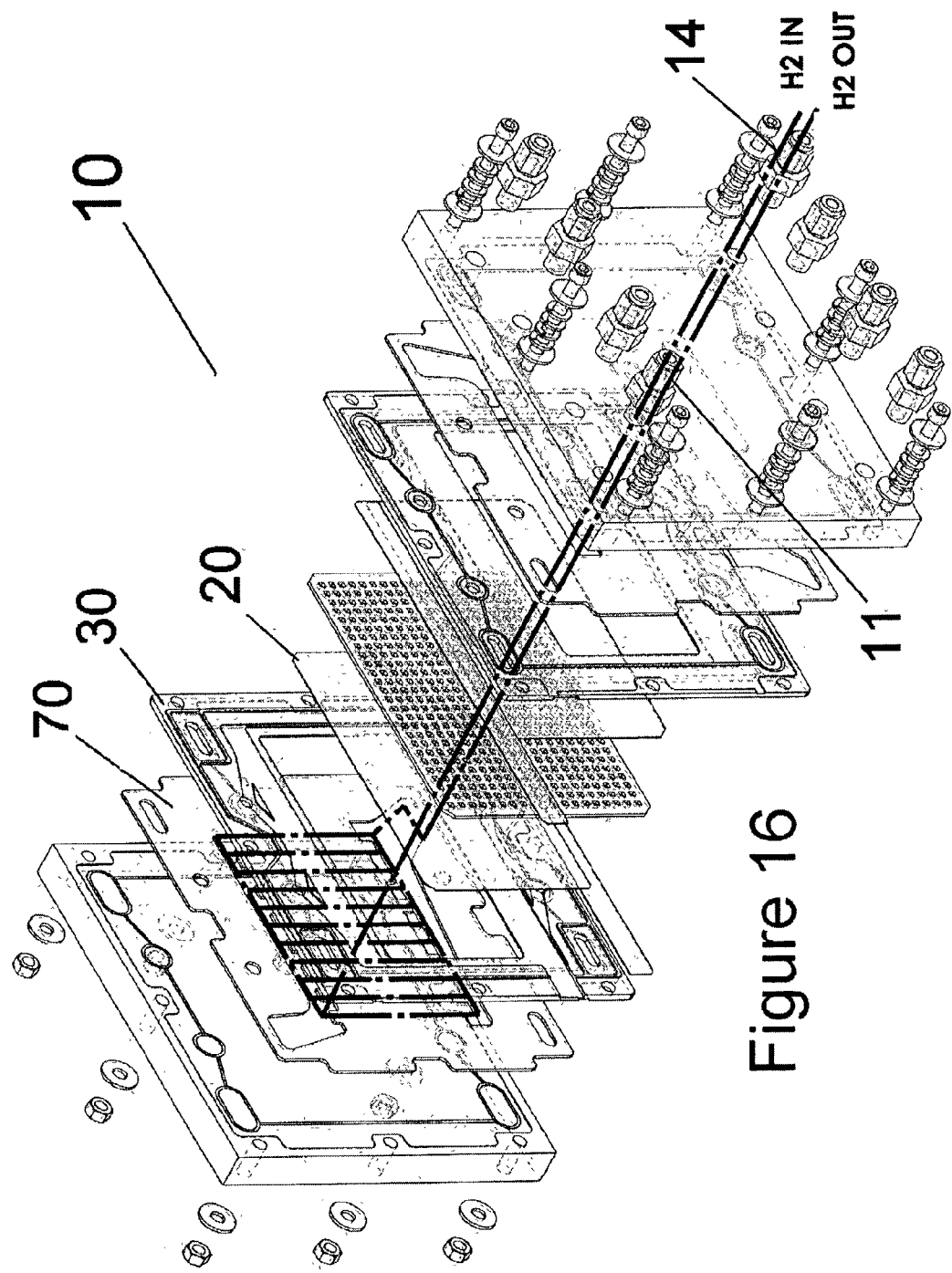
FIG. 16, is an exploded view of the fuel cell of FIG. 6 depicting a flow path for hydrogen through the fuel cell.

The flow of hydrogen through an embodiment of the fuel cell as used in accordance with the present invention is shown in FIG. 16. Hydrogen enters the fuel cell through the hydrogen inlet 11 and flows to the outer side of the hydrogen electrode frame 30. The hydrogen is then distributed through the hydrogen electrode frame 30 and across the hydrogen contacting side 26 of the hydrogen electrode 20 through flow channels formed in the compression plate 70 in contact with the outer side of the hydrogen electrode frame 33. Hydrogen is absorbed through the hydrogen contacting surface 26 into the hydrogen electrode 20. The absorbed hydrogen is catalytically broken down by the anode active material into atomic hydrogen which is stored in the hydrogen storage material as a hydride. The stored atomic hydrogen then reacts at the electrolyte contacting surface 27 with hydroxyl ions to form water. It should be noted that the heat of hydride formation may help to warm the fuel cell to it's optimal operating temperature. Any unabsorbed hydrogen and other contaminant gases or water vapor in the hydrogen supply are vented through the hydrogen outlet 14. The vented gases may be recycled if enough hydrogen is present to warrant recovery. Otherwise the hydrogen may be used to provide a source of thermal energy if needed for other components such as a hydride bed hydrogen storage tank.

Figure 17:
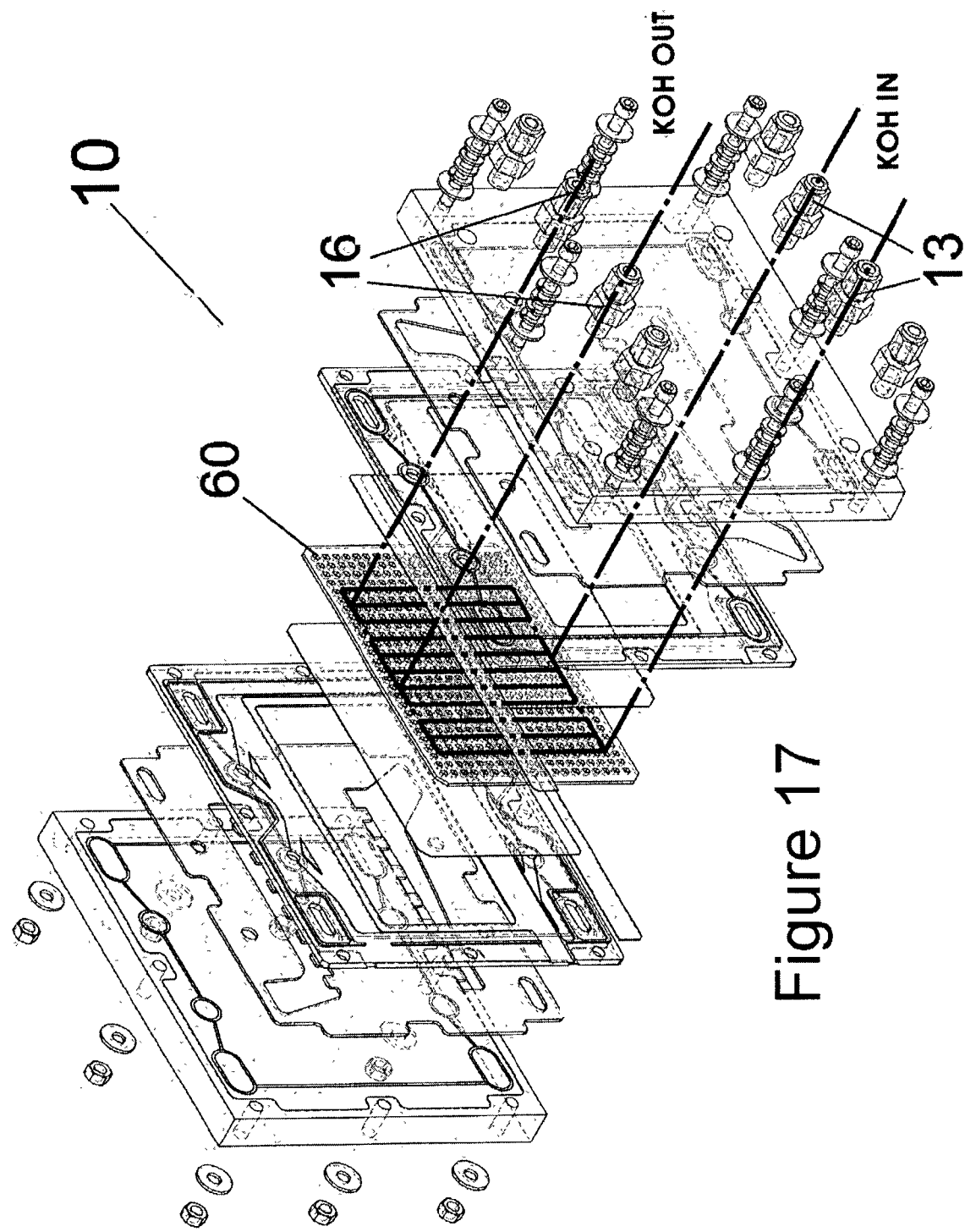
FIG. 17, is an exploded view of the fuel cell of FIG. 6 depicting a flow path for electrolyte solution through the fuel cell.

The flow of electrolyte solution through an embodiment of the fuel cell as used in accordance with the present invention is shown in FIG. 17. The electrolyte solution is an aqueous alkaline electrolyte in intimate contact with the electrolyte contacting surfaces of the hydrogen electrodes and the oxygen electrodes. The alkaline solution is well known in the art and is typically a potassium hydroxide solution. The electrolyte solution is supplied to the porous electrolyte chambers through electrolyte solution inlets 13. The electrolyte solution is distributed through the electrolyte chamber 60 by flow distributing structures located in the hydrogen electrode frame 30 and the oxygen electrode frame 50. The electrolyte solution flows through the electrolyte chamber 60 and contacts the electrolyte contacting surface of the hydrogen electrode 27 and the electrolyte contacting surface of the oxygen electrode 47. The electrolyte provides hydroxyl ions which react with hydrogen ions at the electrolyte contacting surface of the hydrogen electrode and water molecules which react with oxygen ions at the electrolyte contacting surface of the oxygen electrode. The electrolyte is circulated through the fuel cell via inlets 13 and outlets 16 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any loses due to evaporation of water through the electrodes.

Figure 18:
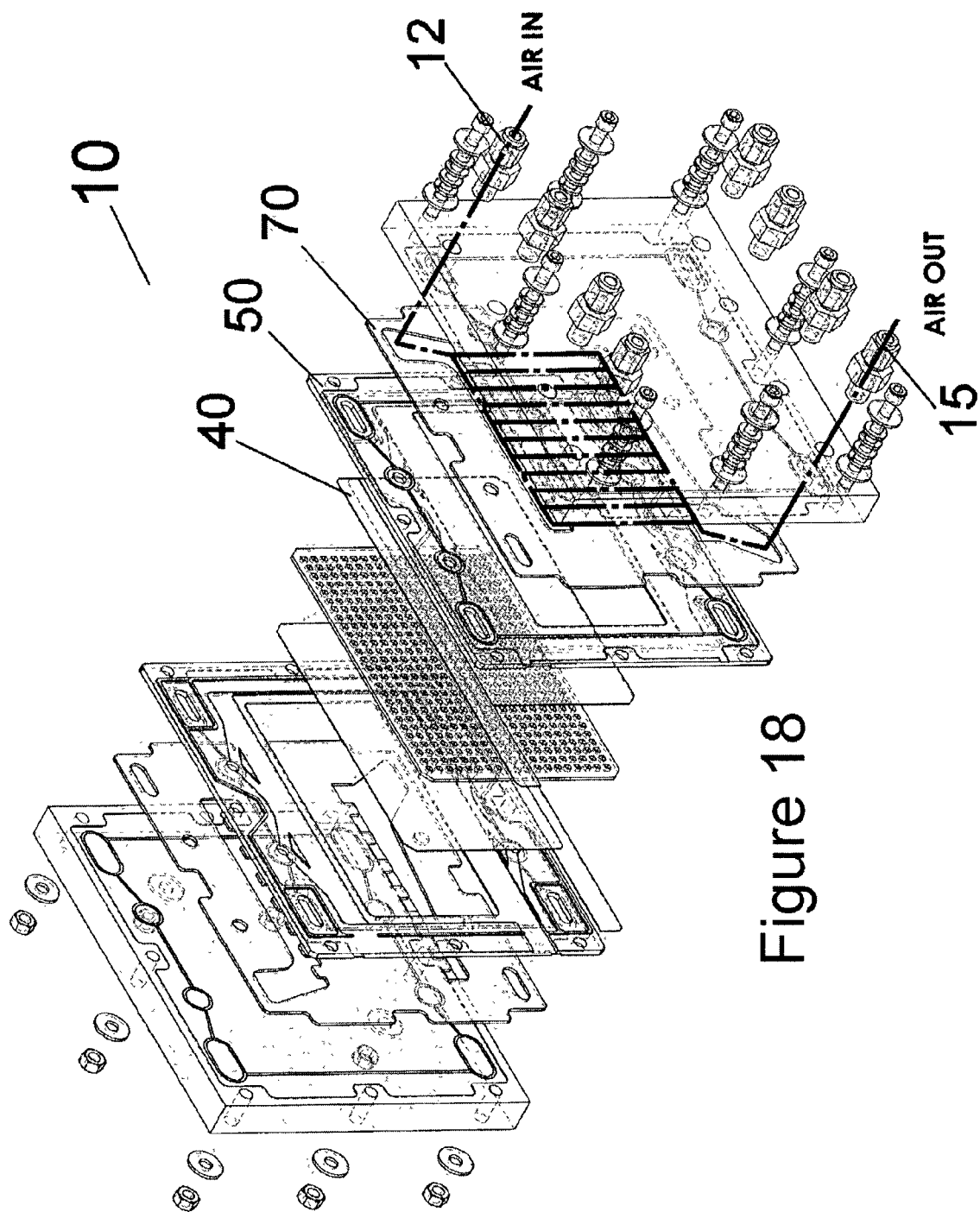
FIG. 18, is an exploded view of the fuel cell of FIG. 6 depicting a flow path for the flow oxygen through the fuel cell.

The flow of oxygen through an embodiment of the fuel cell as used in accordance with the present invention is shown in FIG. 18. Oxygen enters the fuel cell through the oxygen inlet and flows to the outer side of the oxygen electrode plate 50. The oxygen is then distributed through the oxygen electrode frame 50 and across the oxygen contacting side 46 of the oxygen electrode 40 by flow channels formed in the compression plate 70 in contact with the outer side of the oxygen electrode frame 50. Oxygen is then adsorbed through the oxygen contacting surface 46 into the oxygen electrode 40. The adsorbed oxygen is catalytically broken down by the cathode active material. The reactive oxygen is then electrochemically reduced at the electrolyte interface to form hydroxyl ions. Any unabsorbed oxygen and other gases in the feed (e.g. nitrogen, carbon dioxide, etc.) or water vapor in the oxygen supply are vented through the oxygen outlet 15.

The hydrogen storage unit as used in accordance with the present invention may be any type of a unit capable of storing and providing hydrogen. Preferably, the hydrogen storage unit is a metal hydride hydrogen storage unit including a pressure containment vessel containing a hydrogen storage alloy capable of receiving, storing, and providing hydrogen. The metal hydride hydrogen storage unit may also be thermally coupled to a heat source which will provide the hydrogen storage alloy with heat needed to desorb hydrogen stored within the hydrogen storage alloy. The source of heat may be exhaust from the fuel cell, or any type of device employed within the system.

Hydrogen storage alloys used within the metal hydride hydrogen storage unit may be any of those known in art for such purposes. Specific alloys include $AB_2$ and $AB_5$ alloys, such as rare earth-nickel alloys, titanium-manganese alloys, titanium-zirconium alloys, titanium-iron alloys, magnesium alloys, and the like. Examples of such alloys can be found in U.S. Pat. Nos.: 6,193,929; 6,103,024; 5,976,276; 5,916,381; 5,840,440; 4,832,913; 4,431,561 and in U.S. patent application Ser. Nos.: 09/573,240; 09/609,487; 09/902,320; 09/901,816; 09/444,812; 09/873,863, all of which are herein incorporated by reference.

One type of magnesium alloy is a high capacity, low cost, light weight thermal hydrogen storage alloy having fast kinetics in the form of a magnesium based hydrogen storage alloy powder. The alloy contains greater than about 90 weight % magnesium and has a) a hydrogen storage capacity of at least 6 weight %; b) absorption kinetics such that the alloy powder absorbs 80% of it's total capacity within 5 minutes at 300° C.; c) a particle size range of between 30 and 70 microns, and d) a proper microstructure. More preferably the alloy powder has a hydrogen storage capacity of at least 6.5 weight % and most preferably at least 6.9 weight %. Also, the alloy powder more preferably absorbs 80% of it's total capacity within 2 minutes at 300° C. and most preferably within 1.5 minutes. Modifiers elements added to the magnesium to produce the alloys mainly include Ni and Mm (misch metal) and can also include additional elements such as Al, Y and Si. Thus the alloys will typically contain 0.5-2.5 weight % nickel and about 1.0-4.0 weight % Mm (predominantly contains Ce and La and Pr). The alloy may also contain one or more of 3-7 weight % Al, 0.1-1.5 weight % Y and 0.3-1.5 weight % silicon.

Another example of a useful hydrogen storage alloy is a low temperature hydrogen storage alloy which is non-pyrophoric upon exposure to ambient atmosphere. The alloy particularly is non-pyrophoric even after hydrogen charge/discharge cycling. The alloy may be an atomically engineered $TiMn_2$ type alloy. Preferred embodiments of the non-pyrophoric low temperature hydrogen storage alloy comprises titanium, zirconium, vanadium, chromium, and manganese. The alloy may further include iron and aluminum. Atomic engineering of the alloy may be performed by adjusting the composition of the alloy to include increased chromium levels beyond that of conventional $TiMn_2$ alloys. As the chromium content of the alloy increases, the tendency to be pyrophoric decreases. Particularly preferred alloy compositions comprise 0.5-10 at. % Zr, 29-35 at. % Ti, 10-15 at. % V, 13-20 at. % Cr, 32-38 at. % Mn, 1.5-3.0 at. % Fe, and 0.05-0.5 at. % Al. The alloy may further contain 1-10 at. % total of at least one element selected from the group consisting of Ba, Co, Cu, Cs, K, Li, Mm, Mo, Na, Nb, Ni, Rb, Ta, Ti, and W. Specific examples of useful alloys include the compositions $Zr_1 Ti_{33} V_{12.54} Cr_{15} Mn_{36} Fe_{2.25} Al_{0.21}$ and $Zr_{1.5} Ti_{32.5} V_{12.54} Cr_{15} Mn_{36} Fe_{2.25} Al_{0.21}$.

The metal hydride hydrogen storage unit may be any of the known prior art types of unit in which the hydrogen storage alloy may be contained. The unit will preferably have a means for heating and cooling of the alloy as needed to charge and discharge hydrogen therefrom. Examples of such units are described in U.S. Pat. No. 6,293,110 and U.S. patent application Ser. Nos.: 09/871,449; 09/466,579; 09/892,719; 09/558,827; 09/570,314; 09/742,827; and 09/843,201, the disclosures of which are herein incorporated by reference.

As described more fully herein below, the alkaline fuel cell works in combination with a nickel-metal hydride (NiMH) battery pack to power an electric motor which provides propulsion for the hybrid vehicle. The nickel-metal hydride batteries of the present invention are adapted to provide increased specific power and recharge rates that are particularly advantageous in hybrid electric vehicle (HEV) applications. These characteristics are provided while maintaining a high energy density.

Figure 19:
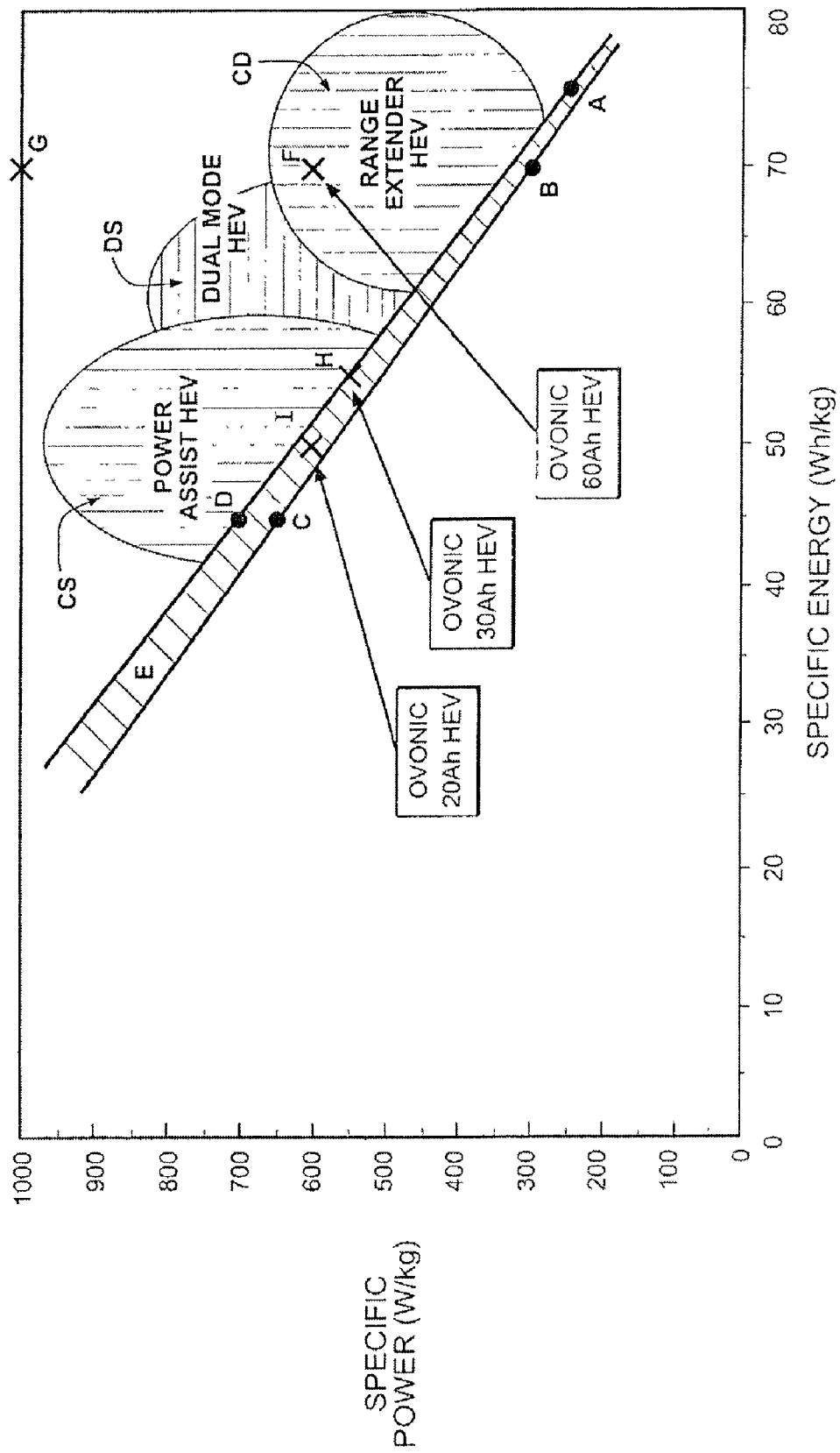
FIG. 19, is a graphical depiction of a relationship between peak power and energy density.

Shown in FIG. 19 is a graphical depiction of the relationship between peak power output and energy density of nickel metal hydride batteries in comparison to the performance of nickel metal hydride batteries of the present invention for various HEV application. FIG. 19 has been divided into sectors depicting those regions in which the various forms of HEV systems would be operated. For example, systems of the charge depleting could fall type in the region designated CD. This is because the battery may not be recharged during operation so the emphasis will be on high energy density for maximum range. This region may also be referred to as the "range extender" region.

In the case of charge sustaining systems, where the battery is recharged during operation, the emphasis is on a higher peak power. The higher peak power may be provided at the expense of a lower energy density, but this is not a necessity. This region is designated CS in the diagram of FIG. 19. This region may also be referred to as the "power assist" region.

Compound or dual mode systems could perform in the region DS in between the regions CD and CS as shown in FIG. 19.

The parameter of peak power is determined in accordance with standards established by the United States Advanced Battery Consortium (USABC). According to these standards, peak power is measured with the battery module discharged to 50% depth of discharge. At this condition a current and corresponding power output which reduces the voltage of the battery to $\frac{2}{3}$ of its open circuit voltage held for a period of ten seconds is the peak power rating of the battery. This determination is made under normal temperature conditions in the range of about 30 to 35° C.

The energy density or specific energy E is measured for the battery module as designed for use in HEV applications. This determination is also made under normal temperature conditions in the range of about 30 to 35° C.

A battery module is an integral assembly of cells connected together and encased in a casing and having external electrical connections for connection to an external circuit or load.

As noted above, the present invention enables operation in the higher performance region above the band E for all HEV system types, i.e., charge depleting, charge sustaining and dual operation.

Points A (75 Wh/kg, 250 W/kg), B (70 Wh/kg, 300 W/kg), C (45 Wh/kg, 650 W/kg) and D (45 Wh/kg, 700 W/kg) define a band E which represents the upper limit of a region defining combinations of both high power density and high energy density above which operation in HEV systems is preferable. The present invention provides improved performance in a region yielding a unique combination of both higher power density and higher energy density than has been possible to attain in battery modules adapted for use in HEV applications.

Taking the upper limits of the shaded band E of FIG. 19, the upper limit of peak power P density attainable for a selected given density E of prior art NiMH battery modules for use in HEV applications can therefore be represented by the following equation:

$$P = 1375 - 15E \quad \text{Equation (1)}$$

where P is the maximum available peak power density (measured in W/Kg) attainable for a given energy density E (measured in Wh/Kg). The present invention permits operation of HEV systems of all types at peak power density levels in relation to energy density in the region that lies beyond these limits.

For example, a battery module embodying the present invention and having an energy density of about 70 Wh/Kg typically exhibits a peak power density of at least 600 W/Kg (shown at point F in FIG. 19) and can have a peak power density as high as 1,000 W/Kg (shown at point G in FIG. 19). These points establish a band of peak power to energy density relationships suited to HEV applications and which are substantially beyond the capability of prior art NiMH batteries.

For example, a 60 Ah HEV battery embodying the present invention can be made having an energy density of about 70 Wh/Kg and a peak power of about 600 W/Kg. This is the example shown at point F in FIG. 19. In another example, a 30 Ah HEV battery having an energy density of about 55 Wh/Kg and a peak power of about 550 W/Kg can also be made. This example is shown at point H in FIG. 19. In a third example, a 20 Ah HEV battery having an energy density of about 50 Wh/Kg and a peak power of about 600 W/Kg can also be made. This example is shown at point I in FIG. 19.

The NiMH battery of the present invention provides the characteristics described through utilization of positive and negative electrodes having increased internal conductance. Such electrodes are formed by pressing powdered metal-hydride active materials into highly conductive porous metal substrates. These porous metal substrates may be formed from copper, a copper alloy, or nickel coated with copper or a copper alloy. Additionally, the substrate may be plated with a material that is electrically conductive and will prevent corrosion of the metal substrate in the battery environment, such as nickel.

The electrodes may also include current collection lines on the substrate. Such current collection lines may have a higher electrical conductivity than the remainder of the substrate. This configuration permits high conductivity pathways from points remote from the current collecting tab on the electrode to the current collection tab. One embodiment of the current collection line comprises densified portions of the porous metal substrate. Another embodiment comprises wires, ribbons or sintered powder electrically attached or embedded into the porous metal substrate. These attached or embedded components can be formed from nickel, copper, a copper alloy, nickel coated with copper, or nickel coated with a copper alloy.

A primary consideration of the present invention involves improving the power output of a nickel-metal hydride (NiMH) rechargeable battery. Generally, power output may be increased by lowering the internal resistance of the battery. Lowering the internal resistance decreases the power wasted due to dissipation within the battery, thereby increasing the power which is available to drive external loads. The internal resistance of a nickel-metal hydride battery can be decreased by increasing the conductivity of the battery components as well as the connections between the components. More specifically, the internal resistance can be decreased by increasing the conductivity of both the positive and negative electrodes of the battery.

The power density of the batteries of the present invention is generally $\geq 1500$ W/L, preferably $\geq 1800$ W/L, and most preferably $\geq 2700$ W/L. The specific power of batteries of the present invention is generally $>600$ W/kg, preferably $\geq 700$ W/kg, and most preferably $\geq 1000$ W/kg. In batteries of the present invention, it is usually necessary to sacrifice energy density in favor of power density. With this in mind, the energy density of the batteries of the present invention is generally between 130-250 Wh/L, preferably $\geq 150$ Wh/L, and most preferably $\geq 160$ Wh/L.

In general, NiMH batteries employ a negative electrode having an active material that is capable of reversible electrochemical storage of hydrogen. Upon application of an electrical potential across a NiMH battery, the active negative electrode material is charged by the electrochemical absorption of hydrogen and the electrochemical generation of hydroxyl ions. The electrochemical reaction at the negative electrode is as follows:

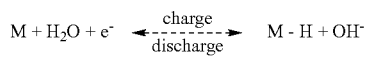

The negative electrode reactions are reversible. Upon discharge, the stored hydrogen is released to form a water molecule and release an electron.

The negative electrodes of a nickel-metal hydride battery are generally formed by pressing powdered active material into a porous metal substrate. As discussed, the powdered active material of the negative electrode includes a hydrogen storage material, such as AB, $AB_2$, or $AB_5$ type hydrogen storage alloys. The hydrogen storage material may be chosen from the Ti—V—Zr—Ni active materials such as those disclosed in U.S. Pat. No. 4,551,400 ("the '400 Patent"), the disclosure of which is incorporated by reference. As discussed above, the materials used in the '400 Patent utilize a Ti—V—Ni composition, where at least Ti, V, and Ni are present with at least one or more of Cr, Zr, and Al. The materials of the '400 Patent are multiphase materials, which may contain, but are not limited to, one or more phases with $C_{14}$ and $C_{15}$ type crystal structures.

There are other Ti—V—Zr—Ni alloys which may also be used for the hydrogen storage material of the negative electrode. One family of materials are those described in U.S. Pat. No. 4,728,586 ("the '586 Patent"), the disclosure of which is incorporated by reference. The '586 Patent discloses Ti—V—Ni—Zr alloys comprising T, V, Zr, Ni, and a fifth component, Cr. The '586 Patent mentions the possibility of additives and modifiers beyond the T, V, Zr, Ni, and Cr components of the alloys, and discusses other additives and modifiers, the amounts and interactions of the modifiers, and the particular benefits that could be expected from them.

In addition to the materials described above, hydrogen storage materials for the negative electrode of a NiMH battery may also be chosen from the disordered metal hydride alloy materials that are described in detail in U.S. Pat. No. 5,277,999 ("the '999 Patent"), to Ovshinsky and Fetcenko, the disclosure of which is incorporated herein by reference.

The negative electrode may be a pasted electrode or may be a compacted electrode which are formed by either pasting or compressing the hydrogen storage material onto a porous metal substrate. Generally, a porous metal substrate includes, but is not limited to, mesh, grid, matte, foil, foam and plate. Preferably, the porous metal substrate used for the negative electrode is a mesh or grid. The porous metal substrate may be formed from one or more materials selected from the group consisting of copper, copper alloy, nickel coated with copper, nickel coated with copper alloy, and mixtures thereof. Preferably, the porous metal substrate is formed from copper or copper alloy.

Alkaline batteries represent an extremely harsh operating environment. In order to protect the electrodes from the harsh environment within the battery, the porous metal substrate formed from the materials describe above may be plated with a material that is electrically conductive yet resistant to corrosion in the battery environment. Examples of materials that can be used to plate the negative electrode include, but are not limited to, nickel and nickel alloy.

Using a porous metal substrate including copper, has several important advantages. Copper is an excellent electrical conductor. Hence, its use can decrease the resistance of the negative electrode. By reducing the resistance of the negative electrode, the battery power wasted due to internal dissipation is lowered to provide a NiMH battery having increased output power.

Copper is also a malleable metal. Malleability is very important because of the expansion and contraction of the negative electrodes during charge and discharge cycling of a NiMH battery. The increased pliability of the substrate helps prevent electrode breakage as a result of the expansion and contraction, thereby resulting in improved battery reliability. Furthermore, copper has excellent thermal conductivity. Thermal conductivity of the copper aids in the temperature management of the batteries of the present invention. Copper's thermal conductivity also tends to further enhance the thermal conductive aspects of the invention described below.

Increased substrate malleability allows the substrate to more reliably hold the active hydrogen storage material that is compressed onto the substrate surface, which can improve battery reliability. Increased substrate malleability can also lessen the need to sinter the negative electrodes after the storage material is compressed onto the substrate surface, which can reduce cost and increase the speed by which the electrodes are made.

Another way to increase power output from a nickel-metal hydride battery is to increase the conductivity of the battery's positive electrodes. As in the case of the negative electrodes, this can be done by appropriately altering the materials from which certain electrode components are made.

The positive electrode may be a sintered type electrode or a non-sintered type electrode, wherein non-sintered electrodes include pasted electrodes. Generally, a pasted positive electrode can be formed by pressing a powdered active positive electrode material into a porous metal substrate. NiMH batteries generally employ a positive electrode having nickel hydroxide as an active material. The reactions that take place at the positive electrode are generally:

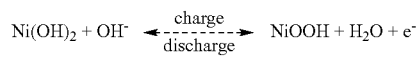

For example, nickel hydroxide positive electrodes are described in U.S. Pat. Nos. 5,344,728 and 5,348,822 (which describe stabilized disordered positive electrode materials) and U.S. Pat. No. 5,569,563 and U.S. Pat. No. 5,567,549 the disclosures of which are incorporated by reference.

The porous metal substrate of the positive electrode includes, but is not limited to, mesh, grid, matte, foil, foam and plate. Disclosed herein, is a positive electrode comprising a porous metal substrate that is formed from one or more materials selected from the group consisting of copper, copper alloy, nickel coated with copper, nickel coated with a copper alloy, and mixtures thereof. Forming the substrate from one or more of these materials increases the conductivity of the positive electrodes of the battery. By increasing the conductivity of the positive electrode, the amount of power wasted due to internal power dissipation can be lowered, which in turn can increase the power output of the NiMH battery.

To protect the positive electrode from the harsh battery environment, the porous metal substrate may be plated with a material which is electrically conductive yet resistant to corrosion in the battery environment. Preferably, the porous metal substrate may be plated with nickel for protection.

The conductivity of the positive electrode may also be increased in other ways. The conductivity of the positive electrode can be increased by introducing lines of higher electrical conductivity into the porous metal substrate. These "current collection lines" are formed so as to have a higher electrical conductivity than the remainder of the substrate and thus provide high conductivity pathways from points remote from the current collection tabs of the positive electrodes.

Figure 20:
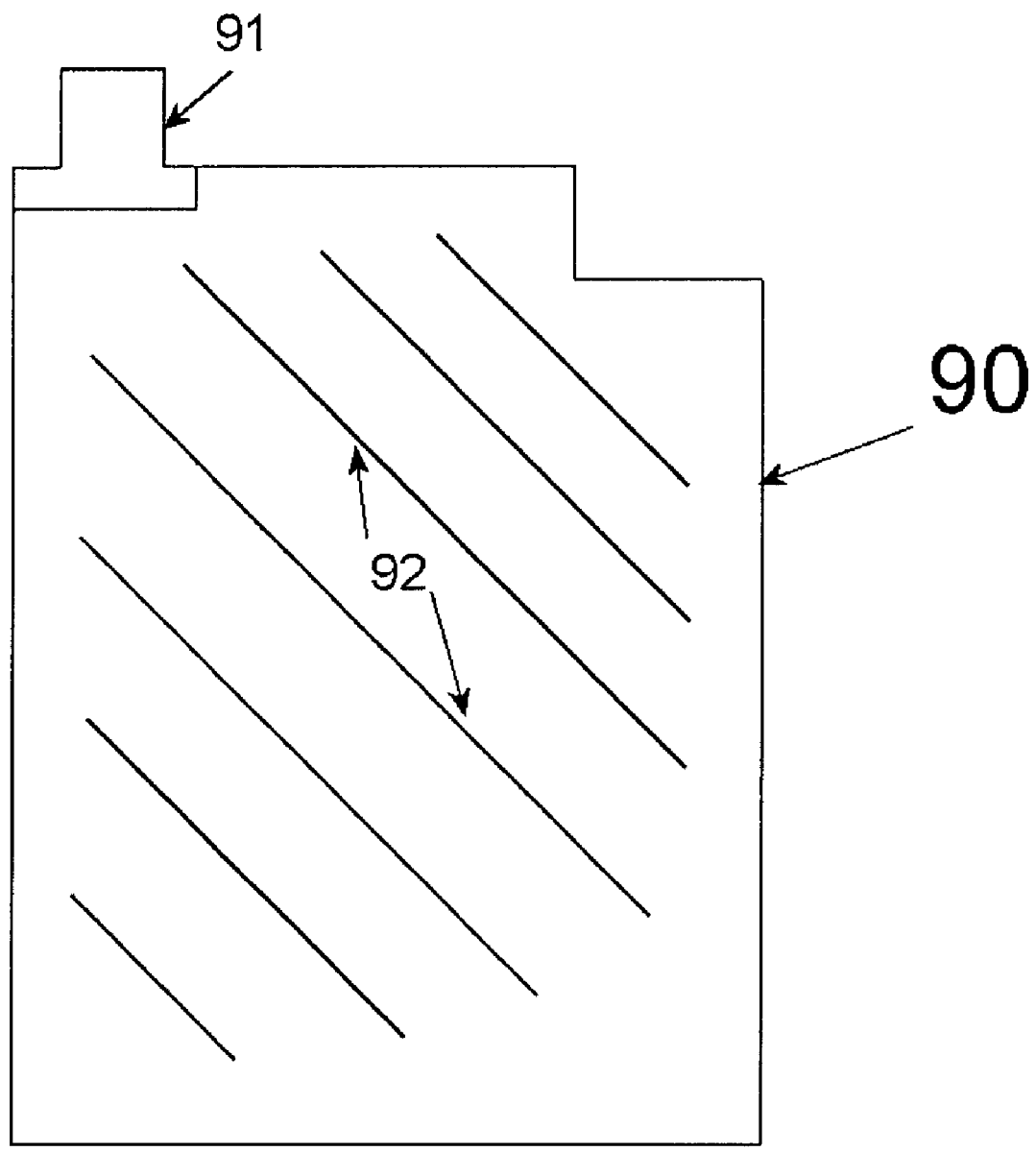
FIG. 20, is a planar illustration of an electrode for a prismatic Ni—MH battery with an attached electrode tab.

An embodiment of a positive electrode comprising current collection lines is shown in FIG. 20. As shown in FIG. 20, attached to the positive electrode 90 is a current collecting tab 91. Generally, the current collecting tab 91 is attached to at least one point of the positive electrode. Preferably, the current collecting tabs are attached along the top of the positive electrodes so that they may be easily connected to the positive battery terminal of the nickel-metal hydride battery. The current collecting tab 91 may be formed of any electrically conducting material which is resistant to corrosion from the battery environment. Preferably, the current collecting tab 91 may be formed of nickel, nickel-plated copper, or nickel-plated copper alloy. Forming the current collecting tab 91 from either nickel-plated copper or nickel-plated copper alloy rather than from nickel decreases the resistance of the tab and increases the power output from the battery. Tabs formed from either nickel-plated copper or nickel-plated copper alloy may be connected to the battery terminal via laser welding.

As described, the current collecting lines provide high conductivity pathways from points remote from the current collection tabs. The current collection lines may be configured in any suitable way. Preferably, the current collection lines are configured to minimize the resistance of the positive electrodes and allow the current flowing in the electrode to reach the collecting tabs with minimal loss of power. Because the current collection lines provide high conductivity pathways for the current, the overall conductivity of the positive electrodes is increased, thereby reducing the waste of internal power dissipation and increasing the power output of the battery. One embodiment of a configuration of the current collection lines is shown in FIG. 20, where the current collecting lines 92 traverse the positive electrode.

The current collection lines may be formed in a porous metal substrate which, as discussed above, includes, but is not limited to, mesh, grid, matte, foil, foam and plate as described above. Preferably, the porous metal substrate is formed from foam. More preferably, the porous metal substrate is formed from nickel foam or nickel plated copper foam.

The current collection lines may be formed by any suitable means. In one embodiment, where the current collection lines comprise densified portions of the porous metal substrate that are more conductive than the remainder of the material, the current collection lines can be formed (i.e. the material densified) by compressing the appropriate portions of the porous substrate.

In yet another embodiment, the current collection lines may be formed by conductive powder which is sintered to the porous substrate in the appropriate configuration. The powder may comprise one or more materials selected from the group consisting of copper, copper alloy, nickel-plated copper, nickel-plated copper alloy, nickel, nickel coated with copper, nickel coated with copper alloy, and mixtures thereof.

Alternately, in another embodiment, the current collection lines may be formed by first forming densified portions or channels in the porous substrate, and then integrating conductive wire, ribbon or powder into these densified portions or channels.

In other embodiments, the current collection lines are formed by conductive wires and ribbons that are electrically connected to the substrate and appropriately placed to minimize the resistance of the electrodes. The wires or ribbons may be formed from one or more materials selected from the group consisting of copper, copper alloy, nickel-plated copper, nickel-plated copper alloy, nickel, nickel coated with copper, and nickel coated with copper alloy, and mixtures thereof.

In another embodiment of the present invention, the conductivity of the positive electrodes is further enhanced by the addition of conductive additives added to the nickel hydroxide active electrode material. Such current conducting additives may be chosen from nickel particles, nickel fibers, graphite particles, nickel plated graphite particles, nickel plated copper particles, nickel plated copper fibers, nickel flakes, and nickel plated copper flakes.

Another aspect of this invention is a nickel-metal hydride battery having at least one positive electrode of the type disclosed herein. And yet another aspect of this invention is a nickel-metal hydride battery having at least one negative electrode of the type disclosed herein.

In NiMH batteries, heating occurs during charging and discharging. Because internal resistance in NiMH batteries is low, less heat is generated than in many prior art types of batteries. During overcharge it is possible that heat generated by the recombination of oxygen, while not significant in small consumer batteries, could become problematic in the batteries of the HEV system described herein. Particularly when plastic cases and pasted electrodes are used.

Heat generated during overcharge can become trapped in the cell where temperatures can reach 80° C. In NiMH batteries, excessive heat can decrease performance and reduce cell life due to separator and seal degradation as well as accelerated degradation of the active materials.

Pasted metal hydride electrodes can be used to improve gas recombination rates and to protect the hydrogen storage alloy from oxidation and corrosion, however, these electrodes have relatively low thermal conductivity. A pasted electrode can be made by mixing the active material powder with plastic binders, such as Teflon, and other nonconductive hydrophobic materials to the electrode. An unintended consequence of this process is a significant reduction in the thermal conductivity of the electrode structure as compared to a structure which consists essentially of 100% conductive active material pressed onto a conductive substrate.

In an embodiment of a sealed NiMH battery for an HEV drive system in accordance with the present invention, the buildup of heat generated during overcharge could be dramatically reduced by using a cell bundle of thermally conductive material. This thermally conductive material contains NiMH particles in intimate contact with each other. Oxygen gas generated during overcharge recombines to form water and heat at the surface of these particles. In the present invention, this heat follows the negative electrode material to the current collector and then to the surface of the case. The thermal efficiency of the bundle of thermally conductive NiMH electrode material can be further improved if this electrode bundle is in thermal contact with a battery case that is also of high thermal conductivity.

In such thermally efficient batteries, the NiMH negative electrode material may be a sintered electrode such as one described in U.S. Pat. Nos. 4,765,598; 4,820,481; and 4,915,898 (the contents of which are incorporated by reference), but sintered so that the NiMH particles are in intimate contact with each other.

Yet another aspect of the present invention is a fluid-cooled battery pack systems (as used herein the terms "battery pack" or "pack" refer to two or more electrically interconnected battery modules). Again, it should be noted that during cycling of the batteries they generate large amounts of waste heat. This is particularly true during charging of the batteries, which in a hybrid vehicle may be constant, or can vary. This excess heat can be deleterious and even catastrophic to the battery system. Some of the negative characteristics which are encountered when the battery pack systems do not have proper thermal management include: 1) substantially lower capacity and power; 2) substantially increased self discharge; 3) imbalanced temperatures between batteries and modules leading to battery abuse; and 4) lowered cycle life of the batteries. Therefore, the battery pack systems need proper thermal management.

Some of the factors to be considered in the thermal management of battery pack systems are 1) batteries and modules should be kept cooler than 65° C. to avoid permanent damage to the batteries; 2) batteries and modules should be kept cooler than 55° C. to get more of the battery's rated performance; 3) batteries and modules should be kept cooler than 45° C. to achieve maximum cycle life; and 4) the temperature difference between individual batteries and battery modules should be kept below 8° C. for optimal performance. It should be noted that the improvements in the instant invention can be used to regulate the temperature difference between batteries to less than about 2° C.

The thermal management of the battery pack system should provide adequate cooling to insure optimal performance and durability of the Ni—MH batteries in a wide variety of operating conditions. Ambient temperatures in the U.S. lie in a wide range from at least −30° C. to 43° C. in the lower 49 states. It is necessary to achieve operational usefulness of the battery packs under this ambient temperature range while maintaining the batteries in their optimal performance range of about −1° C. to 38° C.

Nickel-metal hydride batteries show charge efficiency performance degradation at high temperatures, such as over 43° C., due to problems resulting from oxygen evolution at the nickel positive electrode. To avoid these inefficiencies the battery temperature during charge should ideally be held below these temperatures. Nickel-metal hydride batteries also show power performance degradation at temperatures below about −1° C. due to degraded performance in the negative electrode. To avoid low power, the battery temperature should be held above about −1° C. during discharge.

As alluded to above, in addition to degraded performance at high and low temperatures, detrimental effects can occur as a result of temperature differentials between batteries within a module during charge. Large temperature differentials cause imbalances in charge efficiencies of the batteries, which, in turn, can produce state-of-charge imbalances resulting in lowered capacity performance and potentially leading to significant overcharge and overdischarge abuse. To avoid these problems the temperature differential between the batteries should be controlled to less than 8° C. and preferably less than 5° C.

Other factors in the design of a cooled battery pack system should also be considered. For instance, battery and module packing densities should be as high as possible to conserve space in the end product. Additionally, anything added to the battery pack system for thermal management ultimately reduces the overall energy density of the battery system since it does not contribute directly to the electrochemical capacity of the batteries themselves. To address the above and other requirements, the instant inventors have designed a fluid-cooled battery pack system.

Figure 21:
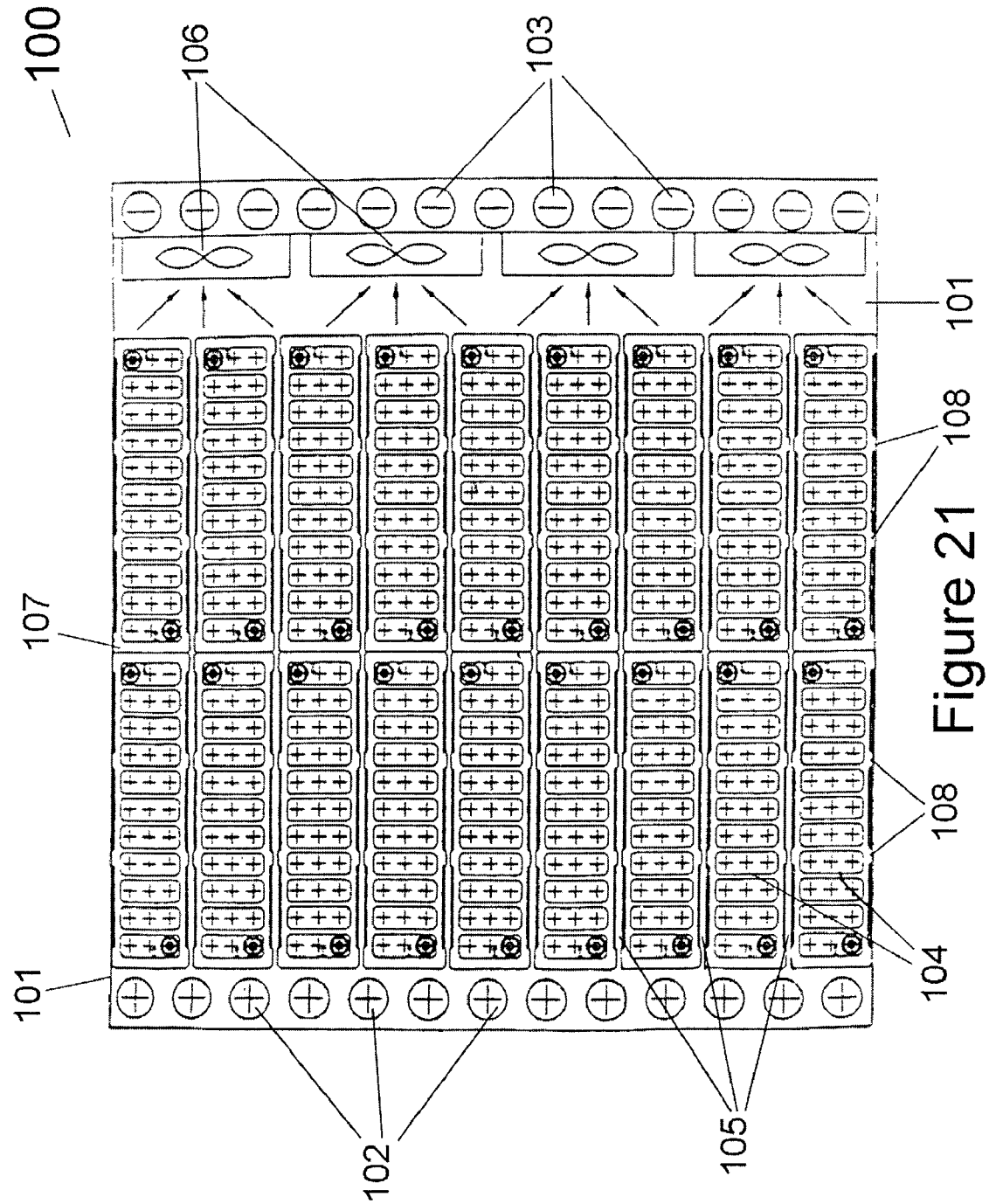
FIG. 21 is a stylized depiction of a top view of one embodiment of a fluid-cooled nickel metal hydride battery pack.

In its most basic form (an embodiment shown in FIG. 21) the instant fluid-cooled battery pack system 100 includes: 1) a battery-pack case 101 having at least one coolant inlet 102 and at least one coolant outlet 103; 2) at least one battery module 104 disposed and positioned within the case 101 such that the battery module 104 is spaced from the case walls and from any other battery modules 104 within the case 101 to form coolant flow channels 105 along at least one surface of the bundled batteries, the coolant flow channels 105 are preferably optimally sized to allow for maximum heat transfer, through convective, conductive and radiative heat transfer mechanisms, from the batteries to the coolant; and 3) at least one coolant transport means 106 which causes the coolant to enter the coolant inlet means 102 of the case 101, to flow through the coolant flow channels 105 and to exit through the coolant outlet means 103 of the case 101.

Preferably the battery pack system 100 includes a plurality of battery modules 104, such as from 2 to 100 modules, arranged in a 2 or 3 dimensional matrix configuration within the case. The matrix configuration allows for high packing density while still allowing coolant to flow across at least one surface of each of the battery modules 104.

The battery-pack case 101 is preferably formed from an electrically insulating material. More preferably the case 101 is formed from a light weight, durable, electrically insulating polymer material. The material should be electrically insulating so that the batteries and modules do not short if the case touches them. Also, the material should be light weight to increase overall pack energy density. Finally, the material should be durable and capable of withstanding the rigors of the battery pack's ultimate use. The battery pack case 101 includes one or more coolant inlets 102 and outlets 103, which may be specialized fluid ports, where required. The coolant inlets and outlets may be or may include merely holes in the battery pack case 101 through which cooling-air can enter and exit the battery pack.

The fluid cooled battery-pack system 100 is designed to use electrically-insulating coolant, which may be either gaseous or liquid. Preferably the coolant is gaseous and more preferably the coolant is air. When air is used as the coolant, the coolant transport means 106 is preferably a forced-air blower, and more preferably a blower which provides an air flow rate of between 1-3 SCFM of air per cell in the pack.

The blowers do not need to continuously force cooling air into the battery pack, but may be controlled so as to maintain the battery pack temperatures within the desired levels. Fan control to turn the fan on and off and preferably to control the speed of the fan may be used to provide for efficient cooling during charging, driving, and idle stands. Typically, cooling is most useful during charge, but is also useful during aggressive driving. Fan speed may be controlled on the basis of the temperature differential between the battery pack and ambient, as well as on the basis of absolute temperature, the latter so as not to cool the battery when already it is already cold or so as to provide extra cooling when the battery nears the top of its preferred temperature range. For nickel-metal hydride batteries, fans are also needed in idle periods after charge. Intermittent cooling is needed to provide for efficient cooling under this condition and results in net energy savings by keeping self discharge rates below fan power consumption. A typical result shows a fan on time of 2.4 hours after the initial post charge cool down. A fan control procedure, such as one described below, can work well in this scenario. Varying fan operation allows for the use of powerful fans for efficient cooling when needed without the consumption of full fan power at all times, thus keeping energy efficiency high. The use of more powerful fans is beneficial in terms of maintaining optimal pack temperature which aids in optimization of pack performance and life.

For example, if the maximum battery temperature desired is over 30° C., fans will turn on and circulate cooler air into the coolant channels when the battery temperature is more than 5° C. above the ambient temperature.

The flow rate and pressure of the cooling fluid needs to be sufficient to provide adequate cooling of the pack. The flow rate of the fluid needs to be sufficient to provide for steady state removal of heat at the maximum anticipated sustained heat generation rate to limit the pack to an acceptable temperature rise. In typical Ni—MH battery packs, with 5-10 W per cell generated during overcharge (maximum heat generation), a flow rate of 1-3 CFM of air per cell is needed to provide adequate cooling simply on the basis of the heat capacity of air and achieving an acceptable temperature rise. Radial blower type fans may be used to provide the most effective airflow for thermal management. This is due to the higher air pressure generated by these fan types as contrasted with that generated by axial fans. Generally, a pressure drop of at least 0.5" of water is required at the operating point of the fan as installed in the pack. To produce this pressure drop at high flow rates generally requires a fan static pressure capability of 1.5" to 3" of water.

In addition to using the fans to cool the battery pack when it is hot, the fans can heat the battery pack when it is too cold. That is, if the battery pack is below its minimum optimal temperature, and the ambient air is warmer than the battery pack (such as from the vehicle compartment on a cold day), the fans may be turned on to draw warmer air into the battery pack. The warmer air can then be used to transfer its thermal energy to the battery pack to warm it to at least the low end of the optimal range of temperature.

One or more coolant transport means 106 can be positioned at the coolant inlet 102 to force fresh coolant into the battery pack case 101, through coolant flow channels 105, and out of the coolant outlet 103. Alternatively, one or more coolant transport means 106 can be positioned at the coolant outlet 103 to draw heated coolant out of the battery pack case 101, causing fresh coolant to be drawn into the battery pack case 101 via the coolant inlet 102, and to flow through the coolant flow channels 105.

The coolant may flow parallel to the longest dimension of the coolant flow channels 105 (i.e. in the direction of the length of the battery modules) or, alternatively, it may flow perpendicular to the longest dimension of said coolant flow channels 105, (i.e. in the direction of the height of the battery module). It should be noted that since the coolant withdraws the waste heat from the batteries as it flows through the cooling channels 105, the coolant heats up. Therefore, it is preferable that the coolant flows perpendicular to the longest dimension of the cooling channels 105. By having the coolant flow perpendicular to the longest dimension more uniform temperature between batteries can be achieved. For example, as the coolant heats up, the temperature difference between the batteries placed down stream from the inlet and the coolant decreases resulting in a decrease of the cooling rate. Thus the batteries may be operating at different temperatures. To minimize this effect, the coolant flow path should be the shorter of the two, i.e. along the height of the batteries.

While air is the most preferred coolant (since it is readily available and easy to transport into and out of the case) other gases and even liquids may be used. Particularly, liquid coolants such as freon, ethylene glycol, or water based as well as other commercially available fluorocarbon and non-fluorocarbon based materials may be used. When these other gases or liquids are used as the coolant, the coolant transport means 106 may preferably be a pump. When using coolants other than air, the coolant transport means may preferably include a coolant return line attached to the coolant outlet 103 which recycles heated coolant to a coolant reservoir (not shown) from which it is transferred to a coolant heat exchanger (not shown) to extract heat therefrom and finally redelivered to the coolant pump 106 for reuse in the cooling of the battery pack 100.

An optimized coolant flow channel size incorporates many different factors. Some of these factors include the number of batteries, their energy density and capacity, their charge and discharge rates, the direction, velocity and volumetric flow rate of the coolant, the heat capacity of the coolant and others. It has been found that independent of most of these factors, it is important to design the cooling channels 105 to impede or retard the cooling fluid flow volume as it passes between the modules. Preferably, the retardation in flow is predominantly due to friction with the cell cooling surfaces, which preferably results in a flow reduction of 5 to 30% in flow volume. When the gaps between modules form the major flow restriction in the cooling fluid handling system, a uniform and roughly equal cooling fluid flow volume in the gaps between all modules, can result in more even cooling, and in reducing the influence of other flow restrictors (such as inlets or exits) which could otherwise produce nonuniform flow between the modules. Furthermore, by optimizing coolant flow channel size, the same area of each cell may be exposed to cooling fluid with similar velocity and temperature.

Battery modules may be arranged for efficient cooling of battery cells by maximizing the cooling fluid velocity in order to achieve a high heat transfer coefficient between the cell surface and the cooling fluid. This is achieved by narrowing the intermodule gap to the point that the cooling fluid volumetric flow begins to diminish, but the fluid velocity is still increasing. The narrower gap also helps raise the heat transfer coefficient as the shorter distance for heat transfer in the cooling fluid raises the cell to fluid temperature gradient.

An optimal coolant flow channel width depends on the length of the flow path in the direction of flow as well as on the area of the coolant flow channel in the plane perpendicular to the flow of the coolant. There is a weaker dependence of optimal gap on the fan characteristics. Closer intermodule spacing at the far end of this row will result in a higher airflow rate and consequently a higher heat transfer coefficient, thus compensating for the higher air temperature downstream. A secondary inlet or series of inlets partway along the horizontal coolant flow path can also be used as a means of introducing additional coolant, thus making the heat transfer between the battery cells and the coolant more uniform along the entire flow path.

In should be noted that the term "centerline spacing" is sometimes used synonymously with coolant flow channel width. The reason for this is that the quoted coolant flow channel widths are average numbers. The reason for this averaging is that the sides of the battery modules which form the flow channels 105 are not uniformly flat and even, the banding which binds the modules together and the sides of the batteries themselves cause the actual channel width to vary along its length. Therefore, it is sometimes easier to describe the width in terms for the spacing between the centers of the individual modules, i.e. the centerline width, which changes for batteries of different sizes. Therefore, it is generically more useful to discuss an average channel width, which applies to battery modules regardless of the actual battery size used therein.

To assist in achieving and maintaining the proper spacing of the modules within the pack case and to provide electrical isolation between the modules, each module includes coolant-flow-channel spacers 107 which hold the modules 104 at the optimal distance from any other modules 104 and from the battery pack case 101 to form the coolant flow channels 105. As disclosed above, the coolant-flow-channel spacers 107 are preferably positioned at the top and bottom of the battery modules 104, providing protection to the corners of the modules 104, the battery terminals and the electrical interconnects. More importantly, tabs on the sides of the spacers 108 hold the modules at the optimal distance apart. The spacers 107 are preferably formed from a light weight, electrically non-conductive material, such as a durable polymer. Also, it is important to the overall pack energy density that the spacers include as little total material as possible to perform the required function and still be as light as possible.

As mentioned above Ni—MH batteries operate best in a specific temperature range. While the cooling system described above enables the battery pack systems of the instant invention to maintain operating temperatures lower than the high temperature limit of the optimal range (and sometimes to operate above the lower temperature limit of the optimal range, if the ambient air temperature is both warmer than the battery and warmer than the lower temperature limit of the optimal range), there are still times when the battery system will be colder than the lower limit of optimal temperature range. Therefore, there is a need to somehow provide variable thermal insulation to some or all of the batteries and modules in the battery pack system.

In addition to the cooling systems described above, another way to thermally control the battery pack systems of the instant invention is by the use of temperature dependent charging regimens. Temperature dependent charge regimens allow for efficient charging under a variety of ambient temperature conditions. One method involves charging the batteries to a continuously updated temperature dependent voltage lid which is held until the current drops to a specified value after which a specified charge input is applied at constant current. Another method involves a series of decreasing constant current or constant power steps to a temperature compensated voltage limit followed by a specified charge input applied at a constant current or power. Another method involves a series of decreasing constant current or constant power steps terminated by a maximum measured rate of temperature rise followed by a specified charge input applied at a constant current or power. Use of temperature dependant voltage lids ensures even capacity over a wide range of temperatures and ensures that charge completion occurs with minimal temperature rise. For example, use of fixed voltage charge lids results in an 8° C. temperature rise in one case where use of temperature compensated charging resulted in a 3° C. temperature rise under similar conditions. Absolute charge temperature limits (60° C.) are required for this battery to avoid severe overheating which can occur in the case of simultaneous failure of charger and cooling system. Detection of rate of change of voltage with respect to time (dV/dt) on a pack or module basis allows a negative value of dV/dt to serve as a charge terminator. This can prevent excessive overcharge and improves battery operating efficiency as well as serving as an additional safety limit.

As discussed above, in addition to having an upper limit on the operational temperature range of the instant batteries, there is also a lower limit. As also discussed above, when the ambient temperature is above the battery temperature, the "cooling system" can be used as a heating system. However, it is much more likely that if the battery pack temperature is low, the ambient temperature will also be low, and probably lower than the battery pack temperature. Therefore, there will be times during operational use of the battery pack system when it will be advantageous to thermally insulate the batteries from the ambient. However, the need for thermal insulation will not be constant and may vary dramatically in only a matter of a very short time period. Therefore, the thermal insulation need will also be variable.

In order to accommodate variable need for thermal insulation, the instant inventors have devised a means for providing variable thermal insulation. The inventive variable thermal insulation means can be used on individual batteries, battery modules and battery pack systems alike.

In its most basic form, the means provides variable thermal insulation to at least that portion of the rechargeable battery system which is most directly exposed to said ambient thermal condition, so as to maintain the temperature of the rechargeable battery system within the desired operating range thereof under variable ambient conditions.

To provide this variable thermal insulation, the inventors have combined temperature sensor means, compressible thermal insulation means and a means to compress the compressible thermal insulation means in response to the temperature detected by the thermal sensor. When the temperature sensor indicates that the ambient is cold, the thermal insulation is positioned in the needed areas to insulated the affected areas of the battery, module or battery pack system. When the ambient is warmer, the temperature sensor causes the thermal insulation to be partly or wholly compressed such that the insulation factor provided to the battery system by the compressible insulation is partially or totally eliminated.

The thermal sensors may be electronic sensors which feed information to piston devices which variably increases or decreases the compression upon a compressible foam or fiber insulation. The thermal sensors may be electronic sensors which feed information to piston devices which variably increases or decreases the compression upon a compressible foam or fiber insulation. Alternatively, (and more preferably from an electrical energy utilization and mechanical reliability point of view,) the sensor and compression devices may be combined in a single mechanical devices which causes variable compression upon the thermal insulation in direct reaction to the ambient thermal condition. Such a combined sensor/compression device and be formed from a bimetallic material such as the strips used in thermostats. Under low ambient temperatures, the bimetal device will allow the thermal insulation to expand into place to protect the battery system from the cold ambient conditions, but when the temperature of the battery or ambient rises, the bimetal device compresses the insulation to remove its insulating effect from the battery system.

While the variable thermal insulation can be used to completely surround the entire battery, module or battery pack system, it is not always necessary to do so. The variable thermal insulation can be just as effective when it only insulates the problems spots of the system. For example, in the battery modules and pack systems of the instant invention, which employ ribbed end plates, it may only be necessary to thermally insulate the ends of the modules which are most directly influenced by low temperature ambient conditions. These ambient conditions may cause large temperature imbalances between the batteries of the module(s) and as a result degrade the performance of the module or pack system. By providing variable insulation to the affected end(s) of the module(s) the temperature differential between the batteries can be reduced or eliminated and the overall temperature of the module(s) can be controlled. Finally, it should also be noted that the thermal insulation does not necessarily need to touch the batteries or modules but can be spaced apart from the modules and leave a dead air zone near the battery or module which acts as an additional thermal insulation.

The battery case of the present invention is preferably constructed of a metallic material such as steel. In a preferred embodiment, the metallic material is stamped, embossed, or shaped to form pressure containing surfaces that counter the internal pressure of the sealed battery and thus prevent bulging of the case. Bulging is detrimental to individual batteries because it alters the electrolyte distribution and spatial orientation of the electrodes and separators. Alternatively, a cylindrical metallic case can be used.

In typical, sealed, metal hydride batteries, the positive electrode is designed to be positive limited. When an electrode is capacity limited, the positive electrode reaches full charge before the negative electrode. When this occurs, oxygen gas evolves at the positive electrode in proportion to the current supplied. In overcharge, all current is producing oxygen gas. In order for the battery to remain sealed, there must be a recombination mechanism for the oxygen gas that is evolved.

One recombination mechanism involves the diffusion of oxygen gas generated at the positive electrode through the separator to the surface of the metal hydride electrode where it recombines. The rate limiting step of this mechanism is the diffusion of the oxygen gas through the electrolyte film to reach the surface of the metal electrode. Once the oxygen gas reaches the surface of the electrode, gas recombination is rapid. If, however, the oxygen must diffuse through a thick film of electrolyte on the surface of the negative electrode, gas recombination rates will be slowed significantly. Thus, the rate of the reaction is proportional to the amount of electrolyte at the surface of the electrode. This amount is referred to as the film thickness of the electrolyte.

An additional aspect of the present invention is a hydrophobic treatment that acts to significantly decrease this film thickness. The described hydrophobic treatment produces a thin electrolyte film precisely where it is the most beneficial, at the surface of the metal hydride negative electrode.

The present invention recognizes that a hydrophobic treatment is most important at the outer surfaces of the metal hydride electrode and, in particular, at the metal-electrolyte interface. The present invention involves a small thin coating on the surface of either the negative electrode or the surface of the separator in contact with the negative electrode. This provides a degree of hydrophobicity where it is needed. The coating of the present invention has a tremendous advantage over the prior art because while the surface of the negative electrode is rendered hydrophobic, the interior remains unaffected. This is because the gas state combination occurs only on the outer surface of the negative. Thus the presence of a hydrophobic interior, as in the prior art, is actually detrimental to electrolyte absorption rates, overall electrolyte absorption, power, cycle life, low temperature, and other performance parameters related to the negative electrode.

It is common for manufacturers of NiMH batteries to mix an organic binder, such as polytetrafluoroethylene (PTFE), with the metal hydride negative electrode alloy powder to prevent cracking and loss of the metal hydride materials. Such a formulation results in hydrophobic material in the bulk of the electrode (thereby increasing electrode resistance) and the resulting hydrophobicity reduces the effectiveness of the initial etch in removing surface impurities. Additionally, hydrophobic binders in the bulk reduce electrolyte absorption which lowers cycle life, decreases conductivity, and takes up space.

Contrary to the teachings of the present application, JP A 4-277467 teaches making the electrode surface hydrophilic by spraying it with alcohol in order to improve the internal pressure.

Unexpectedly, the inventors of the present invention found that in addition to using a negative electrode where the surface facing the separator had been treated to render it hydrophobic it was also possible to attain similar results by using a separator and an untreated negative electrode where the surface of separator facing the negative electrode had been treated to make it hydrophobic. Without wishing to be bound by theory, it is believed that hydrophobic material on the surface of the separator facing the negative electrode is in such intimate contact with the negative electrode that it reduces the film thickness of the electrolyte on the electrode as if the negative electrode itself had been treated.

While at first glance it might appear advantageous to treat the surface of the negative electrode and the surface of the separator facing the negative electrode to render them both hydrophobic, the inventors have found that this is not effective. When both surfaces are treated, the thickness of the resulting hydrophobic material is so great that oxygen recombination is significantly slowed.

JP A 5-242908 describes using a layer of PTFE between the negative electrode and the separator (effectively treating both the surface of the negative electrode and the surface of the separator). While JP A 5-242908 discusses the advantages of oxygen recombination on the electrode, a table in JP A 5-242908 shows cell pressures reduced only to a range of from 81-114 psi. (The temperature of the cells is not indicated.) These pressures are much greater than the pressures in cells of the present invention, as shown in Table 1, below. The use of a coated electrode or separator as described in the present invention, avoids the problems inherent in an extra layer. A coated electrode according to the present invention simplifies and reduces the cost of assembly because the coating can be applied prior to assembly. Using a thin film layer of PTFE between the separator and the electrode would generate a variety of problems during assembly. For example, stretching could produce non-uniform porosity that would produce non-uniform gas recombination and diffusion rates. A coated electrode effectively permits the use of a much thinner hydrophobic layer so that uniform and rapid oxygen recombination is encouraged without impeding diffusion rates.

The present invention is effective with all types of battery systems in which oxygen is evolved at the positive electrode during overcharge. The present invention is particularly useful with nickel metal hydride systems (such as the ones commonly referred to as Ovonic systems, $AB_2$ systems, $AB_5$ systems, and Misch metal systems). Most particularly, the present invention is useful with alloys of the type described in copending U.S. patent application Ser. No. 08/259,793, filed Jun. 14, 1994, titled "ELECTROCHEMICAL HYDROGEN STORAGE ALLOYS AND BATTERIES FABRICATED FROM MG CONTAINING BASE ALLOYS".

The present invention is particularly useful in batteries of the HEV system of the present invention because such batteries must undergo numerous quick charge/discharge cycles. This is because quick charging results in earlier oxygen gas generation. In batteries that are being quick charged it is also important that the oxygen generated during these periods of overcharge be recombined quickly to prevent venting and loss of capacity. In addition, the present invention is particularly effective at high temperatures, which increases its usefulness in batteries that are going to be quick charged. Obviously, the use of the thermal management system described above will increase the efficiencies of such gas recombination.

While a 1% PTFE suspension is specifically demonstrated below, any suitable hydrophobic treatment may be used that will reduce the film thickness of the electrolyte at the surface of the metal hydride negative electrode. Cells of the present invention suffer no performance tradeoffs in cycle life, power, charge retention, or low temperature performance as a result of the hydrophobic treatment.

While any metal hydride alloy may be used, cells of the present invention are preferably fabricated from low pressure negative electrode materials such as those described in U.S. Pat. No. 5,277,999, the contents of which are incorporated by reference. Such hydrogen storage alloys have the composition

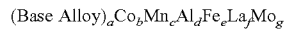

(Base Alloy)$_a$Co$_b$Mn$_c$Al$_d$Fe$_e$La$_f$Mo$_g$ wherein Base Alloy represents a disordered multicomponent alloy having at least one structure selected from the group consisting of amorphous, microcrystalline, polycrystalline (lacking long-range compositional order with three or more phases of the polycrystalline structure), and any combination of these structures; b is 0 to 7.5 atomic percent, preferably 4 to 7 atomic percent; c is 0 to 8.5 atomic percent, preferably 6 to 8 atomic percent; d is 0 to 2.5 atomic percent, preferably 0.1 to 2 atomic percent; e is 0 to 6 atomic percent, preferably 1 to 3 atomic percent or 5.3 to 6 atomic percent; f is 0 to 4.5 atomic percent, preferably 1 to 4 atomic percent; g is 0 to 6.5 atomic percent, preferably 0.1 to 6 atomic percent, most preferably about 6 atomic percent; b+c+d+e+f+g>0; and a+b+c+d+e+f+g=100 atomic percent. A preferred formulation of this Base Alloy contains 0.1 to 60 atomic percent Ti, 0.1 to 25 atomic percent Zr, 0.1 to 60 atomic percent V, 0.1 to 57 atomic percent Ni, and 0.1 to 56 atomic percent Cr and b is 4 to 7 atomic percent; c is 6 to 8 atomic percent; d is 0.1 to 2 atomic percent; e is 1 to 2 atomic percent; f is 0.1 to 4 atomic percent; and g is 0.1 to 6 atomic percent; b+c+d+e+f+g>0; and a+b+c+d+e+f+g=100 atomic percent.

While any positive electrode material compatible with metal hydroxide negative electrodes may be used (such as nickel hydroxide), the positive electrodes of the present invention are preferably of the type described in U.S. Pat. Nos. 5,344,782, 5,348,822, 5,523,182, 5,569,562, and 5,567,549. These electrodes are locally ordered, disordered, high capacity, long cycle life positive electrodes comprising a solid solution nickel hydroxide electrode material having a multiphase structure and at least one compositional modifier to promote the multiphase structure. The multiphase structure of these electrodes comprises at least one polycrystalline γ-phase including a polycrystalline γ-phase unit cell comprising spacedly disposed plates with at least one ion incorporated around the plates, the plates having a range of stable intersheet distances corresponding to a 2$^+$ oxidation state and a 3.5$^+$, or greater, oxidation state. The at least one compositional modifier is a metal, a metallic oxide, a metallic oxide alloy, a metal hydride, and/or a metal hydride alloy. Preferably the at least one compositional modifier is chosen from the group consisting of Al, Bi, Co, Cr, Cu, Fe, Ln, LaH$_3$, Mn, Ru, Sb, Sn, TiH$_2$, TiO, Zn.

The separators and bags of the present material are made from material described in detail in U.S. Pat. No. 5,330,861, the contents of which are incorporated by reference. Described in detail in this application are electrolyte retentive nylon and wettable polypropylene materials that are non-reactive with H$_2$ gas and alkaline electrolyte. The retentive nylon material is capable of absorbing and retaining more electrolyte solution than standard nylon separators. The wettable polypropylene separators are grafted polypropylene material that retain and absorb electrolyte so that particles, barbs, and residues are not produced. Grafted polypropylene material is preferably used for both the separators and the bags of the cells of the present invention.

While the improvements of the battery electrodes described herein are directed toward both the positive and the negative electrodes, this is in no way intended to be limiting. Thus the formation of batteries of the invention comprising sintered negative electrodes combined with enhanced conductivity positive electrodes, or prior art pasted negative electrodes combined with enhanced conductivity positive electrodes, or enhanced conductivity negative electrodes combined with prior art positive electrodes, or enhanced conductivity negative electrodes combined with enhanced conductivity positive electrodes are all intended to be within the scope of the present invention. (The phrase "enhanced conductivity" as used herein is intended to specifically refer to the negative or positive electrodes of the batteries of the present invention.)

EXAMPLE 1

Cells embodying those of the present HEV prototype system were constructed and tested. These cells and the HEV optimized prototype are described in Table 1 below.

TABLE 1

|  | Comparison | HEV Prototype | HEV Optimized Prototype |
| --- | --- | --- | --- |
| power density (W/L) | 1300 | 1600 | 2700 |
| specific power (W/kg) | 600 | 600 | 1000 |
| energy density (Wh/L) | 120 | 190 | 160 |

TABLE 1-continued

|  | Comparison | HEV Prototype | HEV Optimized Prototype |
|---|---|---|---|
| specific energy (Wh/kg) | 55 | 70 | 60 |
| negative electrode construction | pasted | Cu substrate | Cu substrate, thin electrodes |
| negative current collector | nickel | copper | copper |
| negative alloy composition | misch metal | $V_{18}Ti_{15}Zr_{18}Ni_{29}Cr_5Co_7Mn_8$ | $V_{18}Ti_{15}Zr_{18}Ni_{29}Cr_5Co_7Mn_8$ |
| positive electrode | pasted Ni(OH)$_2$ thin | pasted γ-phase Ni(OH)$_2$ thick | pasted γ-phase Ni(OH)$_2$ with conductive additives thin |
| separator | polypropylene thin | polypropylene thin | polypropylene thin |
| case | plastic | stainless steel | stainless steel |
| aspect ratio | square | square | square |
| top | plastic | stainless steel | stainless steel |
| tabs | thick | thick/laser welded | thick/laser welded |

As can be seen from Table 1, the embodiments of the invention, the HEV prototype cells and HEV optimized prototype cells represent improvements over the comparison cells in accordance with the prior art. In particular, the HEV optimized prototype embodies the most dramatic improvements.

Table 1 shows that the Cu substrate of the invention provides the improved current conduction essential for reducing internal resistance. Similarly, the use of conductive additives, such as nickel fibers, nickel plated graphite particles, nickel plated copper particles, nickel plated copper fibers, or the use of a conductive mat embedded in the pasted negative electrode material all contribute to the conductivity of the positive electrode. In addition, the use of thick tabs that are laser welded assures that the improved conductivity of the electrodes is not lost at the collection points. Alternately, negative electrodes having the composition $Ti_{10}Zr_{28}Ni_{36}Cr_5Co_5Mn_{16}$ may be used.

EXAMPLE 2

The impact of the thermally conductive electrodes of the present invention can be evaluated independently. Comparison cells and thermally conductive cells were fabricated as described in Table 2.

TABLE 2

|  | Comparison Cell | Thermally conductive cells |
|---|---|---|
| capacity | 100 Ah | 100 Ah |
| energy density | >>70 Wh/kg | >>70 Wh/kg |
| negative electrode construction | pasted | sintered, compacted |
| negative alloy composition | misch metal | $V_{18}Ti_{15}Zr_{18}Ni_{29}Cr_5Co_7Mn_8$ |
| positive electrode | Ni(OH)$_2$ pasted onto foam substrate | Ni(OH)$_2$ pasted onto foam substrate |
| case | plastic | stainless steel |
| top | plastic | stainless steel |
| temperature after charge/discharge cycling at C/10 overcharge to 120% of capacity | 80° C. | 34° C. |

EXAMPLE 3

Cells (1-7 in Table 3, below) were fabricated as described in U.S. Pat. No. 5,330,861 using a high loft polypropylene separator and negative electrode alloy having the following composition:

$$V_{18}Ti_{15}Zr_{18}Ni_{29}Cr_5Co_7Mn_8$$

except that the separators were sprayed with 1% aqueous solutions of PTFE on the side facing the negative electrode prior to assembling the cell. The control cells (designated C1-C7 in Table 3, below) were assembled using untreated separators.

These cells were charged and discharged at the indicated temperatures. The cells having the 1% PTFE coating on the surface of the separator demonstrated a consistent pressure reduction. As can be seen, this effect is even more pronounced at elevated temperatures and represents a significant improvement over the prior art. Table 3 also shows that cells of the present invention suffer no tradeoffs in terms of capacity.

TABLE 3

|  | Temperature (° C.) | Overcharge Pressure (psi) | Capacity (Ah) |
|---|---|---|---|
| Control cells |  |  |  |
| C1 | 0 | 32 | 4.77 |
| C2 | 10 | 39 | 4.58 |
| C3 | 20 | 89 | 4.46 |
| C4 | 30 | 113 | 4.53 |
| C5 | 40 | 136 | 4.53 |
| C6 | 50 | 175 | 4.45 |
| C7 | 60 | 138 | 3.97 |
| 1% Teflon cells |  |  |  |
| 1 | 0 | 46 | 4.76 |
| 2 | 10 | 44 | 4.45 |
| 3 | 20 | 42 | 4.47 |
| 4 | 30 | 47 | 4.52 |

TABLE 3-continued

|   | Temperature (° C.) | Overcharge Pressure (psi) | Capacity (Ah) |
|---|---|---|---|
| 5 | 40 | 55 | 4.54 |
| 6 | 50 | 75 | 4.49 |
| 7 | 60 | 63 | 4.02 |

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims below.

The invention claimed is:

1. A very low emission hybrid electric vehicle drive system comprising:
   an electric motor;
   at least one nickel-metal hydride battery module for powering said electric motor; and
   a fuel cell for powering said electric motor and recharging said at least one nickel-metal hydride battery module;
   said at least one nickel-metal hydride battery module having an internal resistance effective to provide a peak power density in relation to an energy density as defined by:
   P>1,375−15E, with P greater than 600 Watts/kilogram, where P is the peak power density as measured in watts/kilogram and E is the energy density as measured in Watt-hours/kilogram.

2. The drive system according to claim 1, wherein said peak energy density is at least 70 Wh/Kg.

3. The drive system according to claim 1, wherein said peak power density is greater than 700 Watt/kilogram.

4. The drive system according to claim 1, wherein said peak power density is at least 1000 Watts/kilogram.

5. The drive system according to claim 1, wherein each of said nickel-metal hydride batteries have at least one negative electrode, said negative electrode including a porous metal substrate comprising a material selected from the group consisting of copper, copper alloy, nickel coated with copper, and nickel coated with copper alloy.

6. The drive system according to claim 5, wherein said negative electrode includes an electrode tab, said electrode tab welded to said porous metal substrate.

7. The drive system according to claim 6, where said negative electrode comprises Ovonic alloys.

8. The drive system according to claim 7, where said Ovonic alloys comprise the composition:

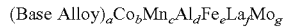

where
   Base Alloy, represents a disordered multicomponent alloy having at least one structure selected from the group consisting of amorphous, microcrystalline, polycrystalline, and any combination of these structures;
   b is 0 to 7.5 atomic percent;
   c is 0 to 8.5 atomic percent;
   d is 0 to 2.5 atomic percent;
   e is 0 to 6 atomic percent;
   f is 0 to 4.5 atomic percent;
   g is 0 to 6.5 atomic percent;
   b+c+d+e+f+g>0; and
   a+b+c+d+e+f+g=100 atomic percent.

9. The drive system according to claim 1, wherein each of said nickel-metal hydride batteries includes at least one positive electrode, said positive electrode comprising an active material comprising a disordered γ-phase positive electrode material.

10. The drive system according to claim 9, wherein said active material further comprises an additive chosen from the group consisting of nickel particles, nickel fibers, graphite particles, nickel plated graphite particles, nickel plated copper particles, nickel plated copper fibers, nickel flakes, and nickel plated copper flakes.

11. The drive system according to claim 1, wherein said nickel metal hydride batteries are low pressure nickel metal hydride electrochemical cells comprising:
   a negative electrode comprising a metal hydride active material;
   a positive electrode comprising a nickel hydroxide active material; and
   a reduced thickness separator positioned around said negative electrode and around said positive electrode, said separator comprising a material selected from the group consisting of nylon, and grafted polyethylene.

12. The drive system according to claim 11, wherein said negative electrode or the surface of said reduced thickness separator facing said negative electrode has a uniform distribution of hydrophobic material.

13. The drive system according to claim 12, where said hydrophobic material comprises a 1% aqueous solution of polytetrafluoroethylene.

14. The drive system according to claim 1, wherein said at least one battery module includes negative electrodes having porous metal substrates formed substantially of copper.

15. The drive system according to claim 1, where said fuel cell is selected from the group consisting of an alkaline fuel cell, a PEM fuel cell, a molten carbonate fuel cell, a direct methanol fuel cell, a phosphoric acid fuel cell, and a solid oxide cell.

16. The drive system according to claim 15, wherein said alkaline fuel cell comprises:
   a hydrogen electrode;
   an oxygen electrode;
   means for contacting said hydrogen electrode with a gaseous hydrogen stream;
   means for contacting said oxygen electrode with a gaseous oxygen containing stream; and
   means for contacting said hydrogen electrode and said oxygen electrode with an electrolyte stream.

17. The drive system according to claim 16, wherein said hydrogen electrode comprises:
   an anode active material having hydrogen storage capacity;
   said anode active material having a gaseous hydrogen contacting surface, an electrolyte contacting surface, and the bulk of said anode active material disposed between said gaseous hydrogen contacting surface and said electrolyte contacting surface;
   said gaseous hydrogen contacting surface is adapted to dissociate and adsorb said gaseous hydrogen;
   said bulk of said anode active material is adapted to store said adsorbed hydrogen;
   said electrolyte contacting surface is adapted to react said stored hydrogen with an electrolyte solution.

18. The drive system according to claim 17, wherein said anode additionally includes a substrate component which provides for both electrical conductivity and mechanical support and comprises an electrically conductive mesh, grid, foam, matte, foil, plate, or expanded metal.

19. The drive system according to claim 17, wherein said anode active material is a hydrogen storage alloy which does not include noble metal catalysts.

20. The drive system according to claim 19, wherein said hydrogen storage alloy is selected from the group consisting of rare-earth/Misch metal alloys, zirconium alloys, titanium alloys, and mixtures of alloys thereof.

21. The drive system according to claim 20, wherein said hydrogen storage alloy has the following composition:

$$(\text{Base Alloy})_a\text{Co}_b\text{Mn}_c\text{Fe}_d\text{Sn}_e$$

where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

22. The drive system according to claim 17, wherein said fuel cell further includes an anode which includes a hydrophobic component.

23. The drive system according to claim 22, wherein said hydrophobic component is polytetrafluoroethylene (PTFE).

24. The drive system according to claim 17, wherein said anode additionally includes a component which provides for electrical conductivity and comprises an electrically conductive powder intimately mixed with said hydrogen storage material.

25. The drive system according to claim 24, wherein said electrically conductive powder comprises at least one material selected from the group consisting of copper, a copper alloy, nickel, a nickel alloy, and carbon.

26. The drive system according to claim 18, wherein said mesh, grid, foam, or expanded metal is formed from nickel, nickel alloy, copper, copper plated nickel or a copper-nickel alloy.

27. The drive system according to claim 17, wherein said anode active material comprises a composite hydrogen storage material including:
  1) an active material having hydrogen storage capacity; and
  2) a catalytic material having greater catalytic activity toward the dissociation of molecular hydrogen and/or oxidation of hydrogen than that of said active material having hydrogen storage capacity.

28. The drive system according to claim 27, wherein said active material and said catalytic material are alternately layered throughout at least a portion of said composite hydrogen storage material.

29. The drive system according to claim 27, wherein said catalytic material comprises a multicomponent compositionally disordered non-equilibrium catalytic material including a host matrix having at least one transition element and having incorporated therein one or more modifier elements, said modifier element modifying the local structural chemical environments of said material to provide said disorder, said material including means for creating an increased density of catalytically active sites for the dissociation of molecular hydrogen.

30. The drive system according to claim 29, wherein said means include:
  a) a plurality of chemical elements for providing a large number of catalytically active sites;
  b) means designed to provide local chemical environments which include sites for selectively inactivating poisonous species; and
  c) non-equilibrium metastable phases and configurations.

31. The drive system according to claim 29, wherein said disordered material is selected from a group consisting of:
  a) a substantially polycrystalline multicomponent material lacking long range compositional order;
  b) a substantially microcrystalline material;
  c) a mixture of polycrystalline or microcrystalline phase regions and amorphous phase regions;
  d) an amorphous material containing at least one amorphous phase; and
  e) a mixture of microcrystalline and polycrystalline phases.

32. The drive system according to claim 27, wherein said catalytic material is continually compositionally graded with said anode active material throughout at least a portion of said anode.

33. The drive system according to claim 27, wherein said anode active material is in the form of particulate material onto which a layer of said catalytic material is deposited.

34. The drive system according to claim 33, wherein said catalytic layer is continually compositionally graded within said anode active material, and has the greatest concentration of catalytic material at the exterior surface of said layer.

35. The drive system according to claim 29, wherein said host matrix includes Ni.

36. The drive system according to claim 29, wherein said modifier element is a transition element.

37. The drive system according to claim 29, wherein said modifier element is selected from the group consisting of Ti, Zr, Mo, V, Mg, Si and Al.

38. The drive system according to claim 37, wherein said catalytic material is a Ni—Ti—Mo alloy.

39. The drive system according to claim 15, wherein said fuel cell is selected from the group consisting of an alkaline fuel cell, a PEM fuel cell, a molten carbonate fuel cell, a phosphoric acid fuel cell, and a solid oxide fuel cell.

40. The drive system according to claim 39 further comprising a hydrogen storage unit adapted to 1) receive hydrogen, 2) store hydrogen, and 3) supply hydrogen to said fuel cell.

41. The drive system according to claim 40, wherein said hydrogen storage unit is a metal hydride hydrogen storage unit including a hydrogen storage material.

42. The drive system according to claim 41, wherein said hydrogen storage material includes $AB_2$ or $AB_5$ type hydrogen storage alloys.

43. The drive system according to claim 42, wherein said $AB_2$ or $AB_5$ type hydrogen storage alloy is selected from the group consisting of rare earth-nickel alloys, titanium-manganese alloys, titanium-zirconium alloys, titanium-iron alloys, or magnesium alloys.

44. The drive system according to claim 43, wherein said hydrogen storage alloy is a powder characterized in that said alloy powder has:
  a) a hydrogen storage capacity of at least 6 weight %;
  b) absorption kinetics such that the alloy powder absorbs 80% of it's total capacity within 5 minutes at 300° C.; and
  c) a particle size range of between 30 and 70 microns.

45. The drive system according to claim 44, wherein said alloy includes at least 90 weight % magnesium.

46. The drive system according to claim 45, wherein said alloy further includes 0.5-2.5 weight % nickel.

47. The drive system according to claim 46, wherein said alloy further includes 1.0-4.0 weight % Misch metal.

48. The drive system according to claim 47, wherein said Misch metal comprises predominantly Ce, La and Pr.

49. The drive system according to claim 48, wherein said alloy further includes one or more from the group consisting of 3-7 weight % Al, 0.1-1.5 weight % Y and 0.3-1.5 weight % silicon.

50. The drive system according to claim 43, wherein said alloy is anon-pyrophoric alloy which comprises 0.5-10 at. % Zr, 29-35 at. % Ti, 10-15 at. % V, 13-20 at. % Cr, 32-38 at. % Mn, 1.5-3.0 at. % Fe, and 0.05-0.5 at. % Al.

51. The drive system according to claim 50, wherein said alloy comprises $Zr_1 Ti_{33} V_{12.54} Cr_{15} Mn_{36} Fe_{2.25} Al_{0.21}$.

52. The drive system according to claim 50, wherein said alloy comprises $Zr_{1.5} Ti_{32.5} V_{12.54} Cr_{15} Mn_{36} Fe_{2.25} A_{0.21}$.

53. The drive system according to claim 50, wherein said alloy further comprises 1-10 at. % total of at least one element selected from the group consisting of Ba, Co, Cu, Cs, K, Li, Mm, Mo, Na, Nb, Ni, Rb, Ta, Tl, and W.

54. The drive system according to claim 1, wherein said drive system is a series hybrid electric vehicle system.

55. The drive system according to claim 1, wherein said drive system is a parallel hybrid electric vehicle system.

56. The drive system according to claim 1, wherein said drive system is a series-parallel hybrid electric vehicle system.

57. The drive system according to claim 1, further including control means for operating said at least one battery module in a charge depleting mode.

58. The drive system according to claim 1, further including control means for operating said at least one battery module in a charge sustaining mode.

59. The drive system according to claim 1, further comprising a fluid cooled battery-pack system, said system comprising:

a battery-pack case including at least one coolant inlet means and at least one coolant outlet means, said at least one battery module disposed within said case such that said module is spacedly disposed from said case and from any other module disposed within said case to form coolant flow channels along at least one surface of said module; and at least one coolant transport means, said coolant transport means causing said coolant to enter said coolant inlet means of said case, to flow through said coolant flow channels, and to exit said coolant outlet means of said case.

60. The drive system according to claim 1, further comprising a cooling system for cooling said at least one nickel metal hydride battery module.

61. The drive system according to claim 1, further comprising:

a regenerative braking system providing charging current for said nickel-metal hydride batteries.

* * * * *